US012128628B2

(12) United States Patent
Li et al.

(10) Patent No.: US 12,128,628 B2
(45) Date of Patent: *Oct. 29, 2024

(54) FLEXIBLE SENSOR FOR ADDITIVE MANUFACTURING DEVICE

(71) Applicant: FORCAST RESEARCH & DEVELOPMENT CORP., Prince George (CA)

(72) Inventors: Si Wan Li, North Vancouver (CA); Gabriel Rodrigo Castanon Delgado, North Vancouver (CA)

(73) Assignee: Forcast Research & Development Corp., Prince George (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/554,769

(22) Filed: Dec. 17, 2021

(65) Prior Publication Data

US 2022/0379563 A1    Dec. 1, 2022

Related U.S. Application Data

(60) Provisional application No. 63/194,516, filed on May 28, 2021.

(51) Int. Cl.
*B29C 64/255* (2017.01)
*B29C 64/124* (2017.01)
(Continued)

(52) U.S. Cl.
CPC .......... *B29C 64/386* (2017.08); *B29C 64/124* (2017.08); *B29C 64/255* (2017.08);
(Continued)

(58) Field of Classification Search
CPC ... B29C 64/124; B29C 64/129; B29C 64/135; B29C 64/255; B29C 64/295;
(Continued)

(56) References Cited

U.S. PATENT DOCUMENTS

| 9,738,034 B2 | 8/2017 | Gruber et al. |
| 10,737,439 B2 | 8/2020 | Ebert et al. |

(Continued)

FOREIGN PATENT DOCUMENTS

| WO | 2018165100 A1 | 9/2018 |
| WO | 2018170545 A1 | 9/2018 |

(Continued)

OTHER PUBLICATIONS

International Search Report dated Jun. 8, 2022 in parent international application PCT/CA2022/050419.

(Continued)

*Primary Examiner* — Jamel M Nelson
(74) *Attorney, Agent, or Firm* — Polson Intellectual Property Law P.C.; Margaret Polson

(57) ABSTRACT

An additive manufacturing device includes a container for containing feed stock material and having an optically transparent bottom wall. The additive manufacturing device further includes a radiation source configured to emit radiation in an optical path incident on the bottom wall and a sensor positioned in the optical path of the radiation above the bottom wall. The sensor is configured to sense a temperature of feedstock material at a reaction interface as the radiation polymerizes at least a portion of the feedstock material. The sensor is constructed to meet a transparency threshold and a flexibility threshold.

19 Claims, 29 Drawing Sheets

(51) Int. Cl.
*B29C 64/386* (2017.01)
*B33Y 10/00* (2015.01)
*B33Y 30/00* (2015.01)
*B33Y 50/00* (2015.01)

(52) U.S. Cl.
CPC ............... *B33Y 10/00* (2014.12); *B33Y 30/00* (2014.12); *B33Y 50/00* (2014.12)

(58) Field of Classification Search
CPC ..... B29C 64/393; B29C 64/259; B33Y 10/00; B33Y 30/00; B33Y 50/02; B33Y 40/20
See application file for complete search history.

(56) References Cited

U.S. PATENT DOCUMENTS

| | | | |
|---|---|---|---|
| 2017/0197360 A1 | 7/2017 | Batchelder | |
| 2017/0334129 A1* | 11/2017 | Ebert | B29C 64/20 |
| 2017/0341307 A1 | 11/2017 | Vilajosana et al. | |
| 2018/0065302 A1* | 3/2018 | Arai | B29C 64/245 |
| 2018/0126671 A1 | 5/2018 | Wilenski et al. | |
| 2018/0272601 A1 | 9/2018 | Erickson et al. | |
| 2019/0240905 A1 | 8/2019 | Von Burg et al. | |
| 2021/0140832 A1* | 5/2021 | Wang | G01N 27/49 |

FOREIGN PATENT DOCUMENTS

| | | | | |
|---|---|---|---|---|
| WO | 2019204258 A1 | 10/2019 | | |
| WO | WO-2020117490 A1 * | 6/2020 | ........... | B29C 64/124 |

OTHER PUBLICATIONS

Written Opinion of the International Searching Authority dated Jun. 8, 2022 in parent International application PCT/CA2022/050419.
Office action dated Jun. 16, 2023 in related U.S. Appl. No. 17/554,756, filed Dec. 17, 2021. Per rule 609.07, copy not provided as this is available in the USPTO system.

* cited by examiner

FLEXIBLE SENSOR FOR ADDITIVE MANUFACTURING DEVICE

BACKGROUND

1. Field

Embodiments described herein relate generally to an additive manufacturing device and a method of operation thereof, and more particularly to an additive manufacturing device including a sensor positioned above a bottom wall of the additive manufacturing device, where the sensor is constructed to meet at least a transparency threshold and a flexibility threshold.

2. Description of Related Art

"Bottom-up" additive manufacturing devices typically involve (a) a container holding resin and having an optically transparent bottom wall, (b) a radiation source positioned below the bottom wall which emits radiation in an optical path upward and incident on the bottom wall to polymerize the resin in the container, and (c) a build platform supporting a structure built from the resin and which moves the structure relative to the bottom wall as the resin is polymerized to form successive layers of the structure. Such bottom-up additive manufacturing devices are also known as vat polymerization devices. The most common forms of vat polymerization devices are SLA (stereolithography) devices and DLP (Digital Light Processing) devices.

In such bottom-up devices, the polymerization of the resin occurs at a reaction interface proximate to the bottom wall. Existing non-contact sensors which measure a temperature of the resin at the reaction interface can be difficult, cumbersome and expensive to implement, and may also be inaccurate. Existing contact temperature sensors typically measure an average temperature of the resin in the container, rather than a specific temperature of the resin at the reaction interface.

SUMMARY

In one embodiment, there is provided an additive manufacturing device including a container for containing feed stock material, the container having an optically transparent bottom wall. The additive manufacturing device further includes a radiation source configured to emit radiation in an optical path incident on the bottom wall and a sensor positioned in the optical path of the radiation above the bottom wall. The sensor is configured to sense a temperature of feedstock material at a reaction interface as the radiation polymerizes at least a portion of the feedstock material and is constructed to meet a transparency threshold and a flexibility threshold.

In another embodiment, there is provided a method involving sensing a temperature of feedstock material within a container of an additive manufacturing device at a reaction interface via a sensor positioned above a bottom wall of the container and in the optical path of radiation emitted by a radiation source. The sensor is constructed to meet a transparency threshold and a flexibility threshold.

Other aspects and features of the present disclosure will become apparent to those ordinarily skilled in the art upon review of the following description of specific embodiments of the disclosure in conjunction with the accompanying figures.

BRIEF DESCRIPTION OF THE DRAWINGS

In drawings which illustrate embodiments.

DETAILED DESCRIPTION

Figure 1:
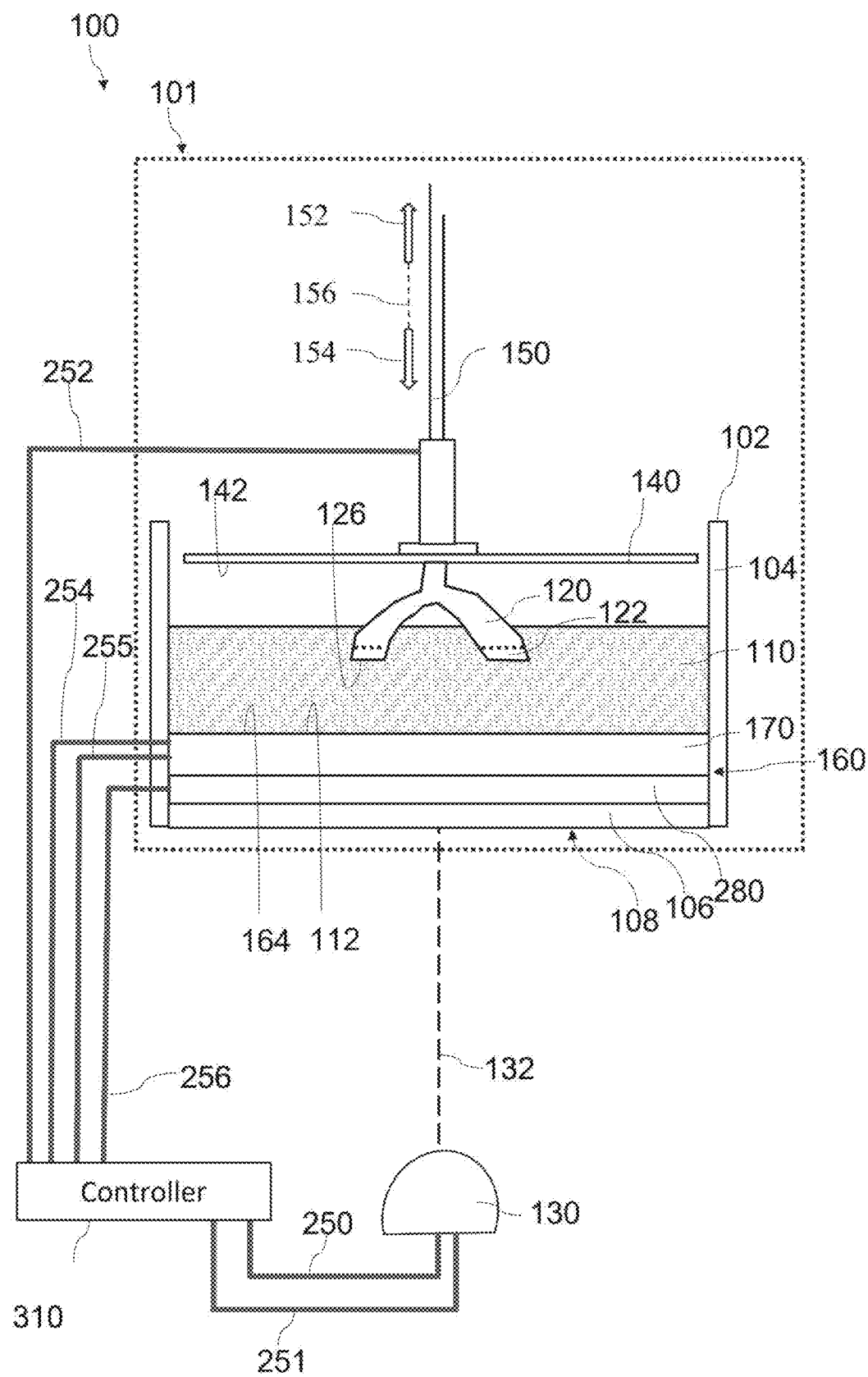
FIG. 1 is a schematic of an additive manufacturing device according to one embodiment.

Referring to FIG. 1, a schematic of an additive manufacturing device according to an embodiment is shown generally at 100. The device 100 is configured to build a structure 120 from feedstock 110 over a build process (such as build process 320 shown in FIG. 17) including a plurality of build cycles (such as build cycles 322*a* and 322*b* shown in FIG. 17), wherein a particular layer 122 of the structure 120 is built in each build cycle.

In the embodiment shown, the device 100 includes a container 102, a build platform 140, an actuator 150 coupled to the build platform 140, an interface assembly 160 including a sensor 170, at least one radiation source 130 and a controller 310 in communication with at least the actuator 150, the sensor 170 and the radiation source 130. The interface assembly 160 also includes an optional heating source 280 and the controller 310 is also in communication with the heating source 280. In other embodiments, the interface assembly 160 may not include the heating source 280, and the device 100 may include fewer or additional components. For example, in some embodiments, the device 100 may include a reservoir of the feedstock 110 and a valve which may allow or restrict flow of the feedstock 110 from the reservoir to the container 102.

The container 102 is configured to retain the feedstock 110. The feedstock 110 may comprise a liquid photopolymer or photocurable resin, which may be polymerized into the solid structure 120 by radiation emitted by the radiation source 130. The container 102 includes a plurality of side walls 104 and a bottom wall 106. The bottom wall 106 defines a build area 108 (best shown in FIG. 2) for forming a layer 122 of the structure 120 from the feedstock 110 during a build cycle. During operation of the device 100, the feedstock 110 is typically provided at a volume within the container 102 such that the feedstock 110 flows to cover the entire build area 108. The container 102 combined with the build platform 140 also generally define a build chamber 101 of the device 100 where the structure 120 is built during a build process.

In the embodiment shown in FIG. 1, the additive manufacturing device 100 is a "bottom-up" additive manufacturing device, such that (a) the radiation source 130 is positioned below the bottom wall 106 and is configured to emit radiation in an optical path 132 upward and incident on the bottom wall 106 and (b) the actuator 150 is positioned above the bottom wall 106 and is configured to move the build platform 140 toward and away from the bottom wall 106 in a substantially vertical travel path 156 during each build cycle as successive layers 122 of the structure 120 are formed.

In bottom-up additive manufacturing devices, the bottom wall 106 may be constructed or configured to be substantially optically transparent. The bottom wall 106 may be considered "optically transparent" when it satisfies a bottom wall transparency threshold, including a bottom wall total transmittance criteria. In this respect, the total transmittance of a material is defined as its effectiveness in transmitting radiation therethrough, and is proportional to a transmission coefficient of the material based on the ratio of total radiation transmitted through a material (e.g. transmitted flux or power) to incident radiation received by the material (e.g. incident flux or power). Total transmittance may be reduced by reflectance and absorbance of the material. The bottom wall 106 may satisfy the bottom wall total transmittance criteria when it has a total transmittance of at least 50% of an emissive spectrum of the radiation emitted by the radiation source 130. In other embodiments, the bottom wall 106 may satisfy the bottom wall total transmittance criteria when it has a total transmittance of at least 60%, at least 70%, at least 80% or at least 90% of the emissive spectrum of the radiation.

The bottom wall 106 may satisfy the transparency threshold by its construction or its configuration. Non-limiting examples of materials which may be used to form the bottom wall 106 include one or more of ultraviolet ("UV") quartz, infrared radiation ("IR") quartz, acrylic, silicate, glass and transparent polymers.

In the embodiment shown, the bottom wall 106 is formed of a rigid material and may not deform during a particular build cycle. However, in other embodiments (not shown), the bottom wall 106 may be formed of a flexible material and may be deformed by forces exerted on (or otherwise experienced by) the interface assembly 160 during a build cycle (such as by movement of the build platform 140 by the actuator 150 for example). Additive manufacturing devices including such flexible bottom walls may further include a tensioning system (not shown) positioned underneath the flexible bottom wall to counteract deformation thereof.

As described above, the radiation source 130 emits radiation in the optical path 132 upward and incident on the bottom wall 106. The radiation emitted is configured to polymerize at least a portion of the feedstock 110 within the container 102 to form a layer 122 of the structure 120 during a build cycle.

In some embodiments, the radiation source 130 may comprise at least one laser (not shown) configured to emit the radiation and at least one galvanometer (not shown) which directs the laser across the build area 108 to different coordinates to sequentially polymerize portions of the layer 122 during a build cycle. In such embodiments, the galvanometer may be responsive to frame signals 250 sent by the controller 310 to direct the laser to specific coordinates on the build area 108 to achieve a particular cross-sectional shape and configuration of the layer 122. In other embodiments, the radiation source 130 may comprises at least one lamp (not shown) configured to emit the radiation and at least one projector (not shown) associated with the lamp. The projector may direct the radiation emitted by the lamp to different portions of the build area 108 or mask certain portions of the radiation emitted by the lamp, to simultaneously polymerize multiple portions of a layer 122 during a build cycle. In such embodiments, the projector may be responsive to the frame signals 250 to direct or mask different portions of the radiation emitted by the lamp to achieve a particular cross-sectional shape and configuration of the layer 122. In some embodiments, the radiation source 130 may include both the laser and the lamp. In yet other embodiments, the radiation source 130 may further include one or more of light emitting diodes, means for generating electron beams, and means for generating fluorescence illumination.

The radiation source 130 may further be configured to emit radiation at suitable emissive spectrum for polymerizing the feedstock 110. For example, the radiation source 130 may be configured to emit radiation in the UV spectrum between 10 nm and 400 nm, radiation in the visible spectrum between 400 nm and 700 nm, radiation in the infrared spectrum between 700 nm and 1 mm, or any combination thereof for example. The radiation source 130 may be responsive to a wavelength component of emission signals 251 sent by the controller 310 to emit the radiation at a particular emissive spectrum, and the wavelength component may be based at least in part on a type of feedstock 110 to be polymerized.

The radiation source 130 may also emit the radiation at a plurality of energy or intensities, and may be configured to emit the radiation as a radiant energy between 0.1 W and 500 W for example. The radiation source 130 may be responsive to an intensity component of the emission signals 251 sent by the controller 310 to emit the radiation at a particular intensity. The intensity component may be based at least in part on a temperature at a reaction interface 112 of the feedstock 110 sensed by the sensor 170.

Figure 17:
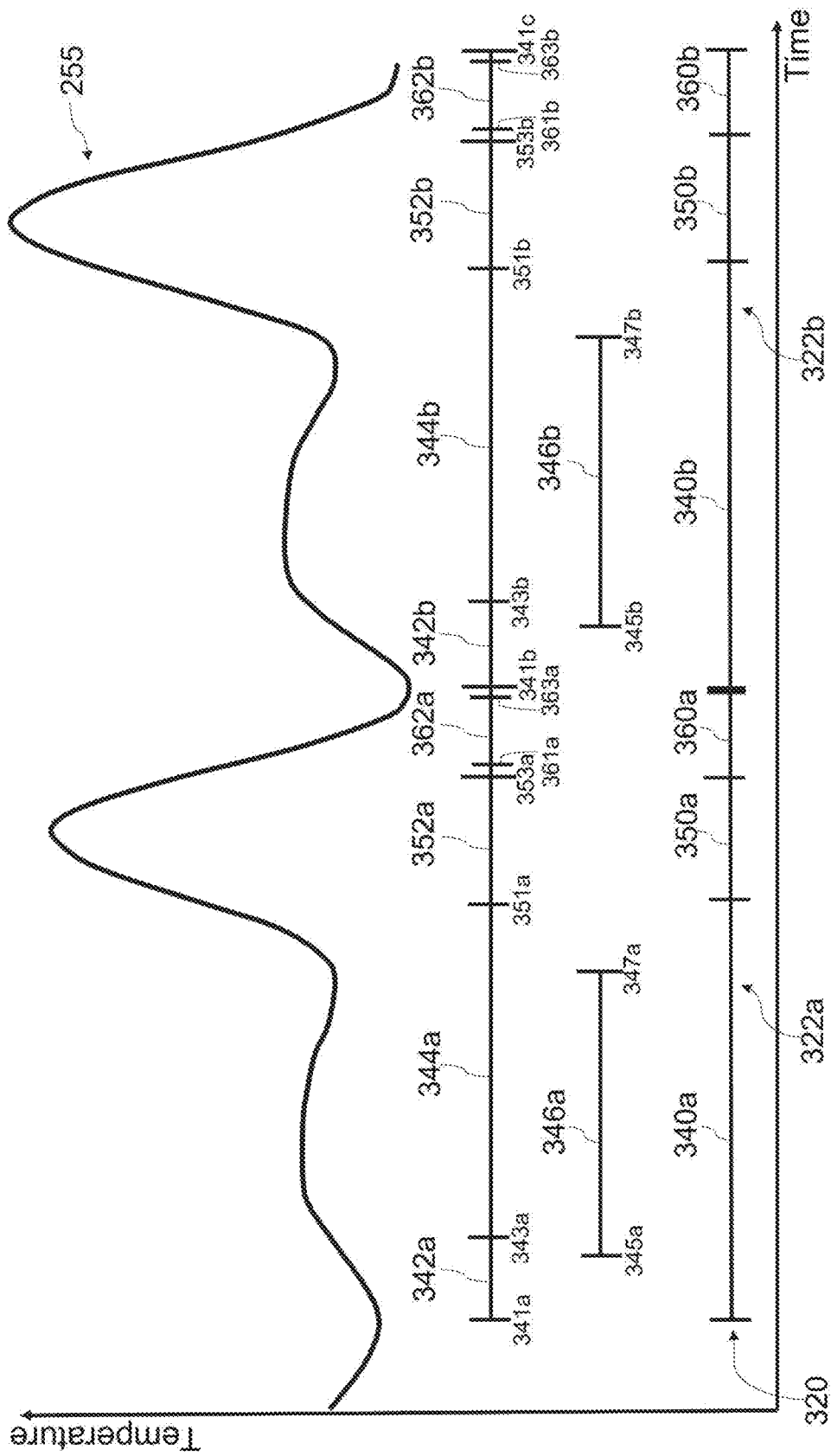
FIG. 17 is a schematic of a change in temperature over time over a plurality of build cycles of a build process during operation of the additive manufacturing device of FIG. 1 according to one embodiment.

Additionally, the radiation source 130 may be configured to emit the radiation at a particular time (an "exposure start time", such as exposure start times 351*a* and 351*b* shown in FIG. 17) during a particular build cycle and for a particular duration (an "exposure interval", such as exposure intervals 352*a* and 352*b* shown in FIG. 17). The radiation source 130 may be responsive to start time and interval components of the emission signals 251 sent by the controller 310 to emit the radiation at a particular start time in a build cycle and for a particular duration respectively. The start time and interval components may be based at least in part on the temperature at the reaction interface 112 sensed by the sensor 170.

The build platform 140 is configured to support the structure 120 during the build process and includes a bottom surface 142 upon which the structure 120 is adhered to. In some embodiments, the build platform 140 may define through channels to increase flow of the feedstock 110 therethrough as the build platform 140 is moved towards and away from the bottom wall 106 (and into and out of the feedstock 110 within the container 102) during a build cycle.

The actuator 150 is coupled to the build platform 140 and is configured to move the build platform 140 along the travel path 156 in an upward direction 152 away from the bottom wall 106 and in a downward direction 154 toward the bottom wall 106 during each build cycle. For example, the actuator 150 may comprise a micro-linear actuator configured to vertically move the build platform 140 in increments of 0.1 µm. The actuator 150 may be responsive to a direction component of actuator signals 252 sent by the controller 310 to move the build platform 140 in either the upward or downward directions 152 or 154, and the direction component may be based at least in part on a stage (such as pre-exposure stages 340*a* and 340*b* or post-exposure stages 360*a* and 360*b* shown in FIG. 17) of a build cycle.

The actuator 150 may also be configured to move the build platform 140 at particular times (an "movement start time", such as pre-exposure movement start times 341*a* and 341*b* and post-exposure movement start times 361*a* and 361*b* shown in FIG. 17) during a particular build cycle. The actuator 150 may be responsive to a start time component of the actuator signals 252 sent by the controller 310 to move the build platform 140 at particular start times in a build cycle, and the start time component may be based at least in part on the temperature at the reaction interface 112 sensed by the sensor 170.

The actuator 150 may also be configured move the build platform 140 along the travel path 156 at different speeds. For example, the actuator 150 may be configured to move the build platform 140 between a speed of approximately 10 µm/s and approximately 20,000 µm/s. The actuator 150 may be responsive to a speed component of the actuator signals 252 sent by the controller 310 to move the build platform 140 at a particular speed, and the speed component may also be based at least in part on the temperature at the reaction interface 112 sensed by the sensor 170.

The actuator 150 may also be configured to move the build platform along the travel path 156 different distances in either the upward or downward directions 152 or 154. For example, the actuator 150 may be configured to move the build platform 140 in the upward direction 152 between approximately 10 µm and approximately 10,000 µm, and in the downward direction 154 between approximately 0 µm and approximately 10,000 µm, during a build cycle. The actuator 150 may also be configured to move the build platform 140 such that a bottom layer surface 126 of the portion of the structure 120 adhered to the build platform 140 (or the bottom surface 142 of the build platform 140 during a first build cycle of the build process) is a layer distance 144 away from a build surface 164 of the interface assembly 160 (best seen in FIG. 18A). The actuator 150 may be responsive to travel distance and position components of the actuator signals 252 sent by the controller 310 to move the build platform 140 for a particular travel distance in either the upward or downward directions 152 or 154, and the travel distance and position components may also be based at least in part on a temperature at the reaction interface 112 sensed by the sensor 170.

The interface assembly 160 is configured to be positioned within the container 102 above the bottom wall 106 and underneath the feedstock 110 when the feedstock 110 is within the container 102, such that the interface assembly 160 is in the optical path 132 of the radiation emitted by the radiation source 130 between the feedstock 110 to be polymerized and the radiation source 130.

The interface assembly 160 includes at least one layer, where a top surface of a top layer of the interface assembly 160 forms the build surface 164 where polymerization of the feedstock 110 occurs in a build cycle. The feedstock 110 forms the reaction interface 112 where the feedstock 110 contacts the build surface 164.

Figure 2:
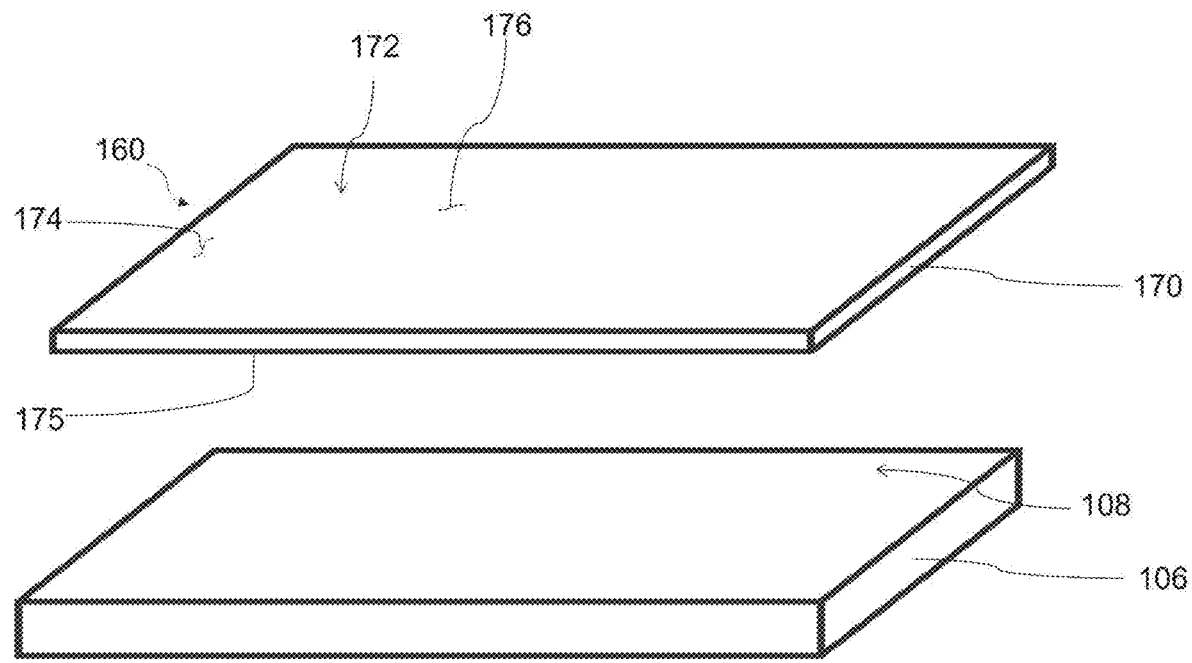
FIG. 2 is a perspective view of an interface assembly of the additive manufacturing device of FIG. 1 according to one embodiment.
Figure 3:
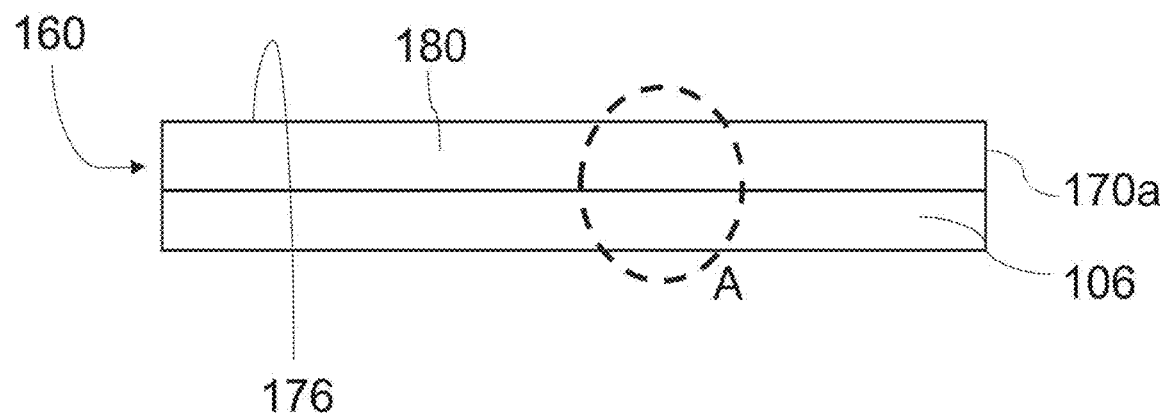
FIG. 3 is a schematic of the interface assembly of FIG. 2 according to one embodiment.

The interface assembly 160 includes the sensor 170. Referring to FIG. 2, the sensor 170 comprises a contact sensor having a length and a width defining a sensor area 172. Referring to FIG. 2, in the embodiment shown, the sensor area 172 corresponds to the build area 108 defined by the bottom wall 106. In other embodiments, the sensor area 172 may be different from the build area 108. The sensor 170 has a top surface 174 and a bottom surface 175. In the embodiment shown, the sensor 170 is constructed or configured to sense a temperature of material in contact with the top surface 174, and as such the top surface 174 forms a sensor interface 176. In other embodiments, the sensor 170 may instead be constructed or configured to sense a temperature of material in contact with the bottom surface 175, and the bottom surface 175 may form the sensor interface 176 instead. Further, in the embodiment shown, the sensor 170 is the only layer of the interface assembly 160. As such, the bottom surface 175 directly contact the bottom wall 106 and the top surface 174 is configured to directly contact the feedstock 110 when the feedstock 110 is within the container 102. The top surface 174 thus also forms the build surface 164 of the interface assembly 160 and the sensor interface 176 is configured to directly sense a temperature of the reaction interface 112 it is in contact with. In embodiments where the interface assembly 160 includes additional layers (such as one or more of the sensor 170, at least one separating layer 260, at least one structural layer 270 and the heating source 280 shown in FIGS. 10-16), the sensor 170 may be separated from the bottom wall 106 by one or more layers and/or may be separated from the feedstock 110 by one or more layers. In such embodiments, the top surface 174 may contact other layers of the interface assembly 160 and the sensor interface 176 may sense a temperature of the other layers instead. However, in some of such embodiments, the temperature of the other layers may be used as a proxy for the temperature of the reaction interface 112 due to at least in part to a thinness, construction or configuration of these other layers.

Referring back to FIG. 1, in some embodiments, the sensor 170 may sense the temperature at the sensor interface 176 continuously during a build cycle, and may send the sensed temperatures to the controller 310 as temperature data signals 255. In other embodiments, the sensor 170 may be configured to start sensing temperature at the sensor interface 176 at a particular start time (a "sensing start time") during a build cycle and for a particular duration (a "sensing interval"), and may only send the sensed temperatures to the controller 310 as the temperature data signals 255 during the sensing interval. The sensor 170 may be responsive to start time and interval components of sensor signals 254 sent by the controller 310 to begin sensing the temperature at the sensor interface 176 at a particular start time in a build cycle and to continue sensing for a particular duration, and the start time and interval components may be based at least in part on the stage (such as the pre-exposure stages 340*a* and 340*b*, exposure stages 350*a* and 350*b* and the post-exposure stages 360*a* and 360*b* shown in FIG. 17) of a build cycle.

The materials used to construct or configure the sensor 170 may be required to satisfy a variety of different thresholds before the sensor 170 can be suitable for use in the device 100. For example, the sensor 170 may be constructed or configured to sense a variety of different temperatures at the sensor interface 176 and may be required to satisfy a temperature sensitivity threshold. The temperature sensitivity threshold may be defined by one or more of a coefficient criteria, a linearity criteria and a precision criteria. In other embodiments, the temperature sensitivity threshold may include additional or fewer criteria.

In embodiments where the sensor 170 is constructed as a resistance-based temperature sensor, the sensor 170 may include conductive material. A resistance of the conductive material may change (such as increase or decrease for example) in response to a change in temperature. The correlation of a change in resistance to a change in temperature comprises a temperature coefficient of resistance of the conductive material. In certain embodiments, the temperature coefficient of resistance is defined as a change in resistance per degree Celsius of change in temperature. Where the temperature coefficient of resistance of a particular conductive material is large, small changes in temperature may be more easily detected by the conductive material as a small change in temperature may translate into a large change in resistance. The sensor 170 may satisfy the coefficient criteria when it has a temperature coefficient of resistance of at least $\pm 0.0001\Omega/\Omega/°$ C. or $\pm 1\times 10^{-4}\Omega/\Omega/°$ C. In other embodiments, the sensor 170 may satisfy the coefficient criteria when it has a temperature coefficient of resistance of at least $\pm 0.0005\Omega/\Omega/°$ C. or $\pm 5\times 10^{-4}\Omega/\Omega/°$ C., at least $\pm 0.001\Omega/\Omega/°$ C. or $\pm 1\times 10^{-3}\Omega/\Omega/°$ C. or at least $\pm 0.005\Omega/\Omega/°$ C. or $\pm 5\times 10^{-3}\Omega/\Omega/°$ C.

The temperature coefficient of resistance of a conductive material may change at specific temperatures and the correlation of resistance to temperature for a specific conductive material may be non-linear across a temperature range. For example, a particular conductive material may have first temperature coefficient of resistance at a first temperature range A and a second temperature coefficient of resistance at a second temperature range B. Conductive material which provides a substantially linear correlation of resistance to temperature across the temperature range that the device 100 normally operates can provide more accurate correlation of changes in temperature to changes in measured resistance. The sensor 170 may satisfy the linearity criteria when it substantially maintains a temperature coefficient of resistance within the temperature range for a particular build process. For example, the sensor 170 may satisfy the linearity criteria if it maintains $\pm 20\%$ variation in a temperature coefficient of resistance within a temperature range between 0° C. and 150° C. In other embodiments, the sensor 170 may satisfy the linearity criteria if it maintains $\pm 30\%$ variation, $\pm 10\%$ variation or $\pm 5\%$ variation of a temperature coefficient of resistance within a temperature range between 0° C. and 150° C.

As noted above, when the temperature coefficient of resistance of a particular conductive material is large, small changes in temperature may be more easily detected by the conductive material and the sensor 170 may be more precise. The sensor 170 may satisfy the precision criteria when it has a temperature coefficient of resistance which enables it to detect temperature changes of at least 10° C. within a temperature range between 0° C. and 150° C. In other embodiments, the sensor 170 may satisfy the precision criteria when it has a temperature coefficient of resistance which enables it to detect a temperature change of at least 5° C., at least 1° C. or at least 0.5° C. within a temperature range between 0° C. and 150° C.

As the sensor 170 is positioned within the optical path 132 of the radiation source 130, the sensor 170 is also constructed or configured to be substantially optically transparent. The sensor 170 may be considered "optically transparent" when it satisfies a transparency threshold. The transparency threshold may be defined by one or more of a total transmittance criteria, a transmission haze criteria, and a transmission clarity criteria. In other embodiments, the transparency threshold may include additional or fewer criteria.

The total transmittance of a material was described above in association with the bottom wall 106, and is generally defined as the material's effectiveness in transmitting radiation therethrough. The sensor 170 may satisfy the total transmittance criteria when it has a total transmittance of at least 50% of the emissive spectrum of the radiation emitted by the radiation source 130. In other embodiments, the sensor 170 may satisfy the total transmittance criteria when it has a total transmittance of at least 60%, at least 70%, at least 80%, or at least 90% of the emissive spectrum of the radiation.

The total transmittance of a material can be a combination of: (1) direct transmittance, where the incident radiation passes through the material at a predictable specular angle and (2) diffuse transmittance, where the incident radiation is scattered by the material at numerous, random and unpredictable angles. Material which has a high total transmittance but also high diffuse transmittance may not be suitable for use as the sensor 170, as it may result in loss of fidelity of the polymerized layer 122 to the frame representing a desired shape and configuration of the layer 122 to be formed (such as the frame in the frame signals 250 sent from the controller 310 to the radiation source 130 shown in FIG. 1). For example, diffuse transmittance where the incident radiation is scattered by the material at narrow-angles may cause a loss of clarity, reducing sharpness of the frame transmitted to the feedstock 110 through the material. Narrow-angle scattering may be caused by large irregularities of the material. Additionally, diffuse transmittance where the incident radiation is scattered by the material at wide-angles may cause transmission haze, resulting in a loss of transmissive contrast and distorting the frame transmitted to the feedstock 110 through the material. Wide-angle scatter may be caused by small irregularities of the material. Irregularities of a material include without limitation impurities, surface structure, internal optical irregularities (e.g. poorly dispersed particles, non-uniform particle size, inhomogeneous crystallization, density difference), microscopic structures and porosity. Reducing irregularities of the material used to construct the sensor 170 may limit wide-angle and narrow-angle diffuse scattering.

Wide-angle scattering of incident radiation by a material may be defined as a percentage of radiation transmitted through the material that deviates from a principal direction of the incident radiation by a wide-angle of more than about 2.5° degrees. In some embodiments, the sensor 170 may satisfy the transmittance haze criteria when it scatters less than 30% of the radiation incident on the bottom surface 175 at the wide-angle. In other embodiments, the sensor 170 may satisfy the transmission haze criteria when it scatters less than 25%, less than 20% or less than 15% of the incident radiation at the wide-angle. Narrow-angle scattering of incident radiation by a material may be defined as the percentage of radiation transmitted through the material that deviates from a principal direction of the incident radiation at a narrow-angle in a range of more than about 0° and less than or equal to about 2.5°. In some embodiments, the sensor 170 may satisfy the transmittance clarity criteria when it scatters less than 50% of the radiation incident on the bottom surface 175 at the narrow-angle. In other embodiments, the sensor 170 may satisfy the transmission clarity criteria when it scatters less than 45%, less than 40%, less than 35% or less than 30% of the incident radiation at the narrow-angle. In some embodiments, the sensor 170 may satisfy the transparency threshold when it exhibits a total transmittance of 50% or greater, wide-angle scattering of 30% or less and narrow-angle scattering of 50% or less.

The transparency threshold including the total transmittance criteria, the transmission haze criteria and the transmission clarity criteria may be applied to the sensor 170 alone, such that only transmittance through the sensor 170 (from the bottom surface 175 to the top surface 174) is assessed to determine whether the transparency threshold is satisfied. In other embodiments, the transparency threshold may be applied to the entire interface assembly 160, such that the combination of layers of the interface assembly 160 (such as the combination of one or more of the sensor 170, the at least one separating layer 260, the at least one structural layer 270 and the heating source 280 shown in FIGS. 10-16) are required to collectively satisfy the transparency threshold. In such embodiments, transmittance through the entire interface assembly 160 may be assessed to determine whether the transparency threshold is satisfied. In yet other embodiments, the transmission threshold may be applied to a combination of the entire interface assembly 160 and the bottom wall 106, such that the combination of the layers of the interface assembly 160 and the bottom wall 106 are required to collectively satisfy the transparency threshold. In such embodiments, transmittance through the combination of the bottom wall 106 and the interface assembly 160 may be assessed to determine whether the transparency threshold is satisfied.

As described below in association with FIG. 17, build cycles of the build process 320 may exert a force on the interface assembly 160 (including the sensor 170). The force exerted on the interface assembly 160 may be caused by the movement of the build platform 140 (and the portion of the structure 120 adhered to the build platform 140) by the actuator 150. However, during certain stages (such as the post-exposure stages 360a and 360b shown in FIG. 17) of a build cycle, movement of the build platform 140 may not exert any force on the interface assembly 160. The force may be dynamic or static, and may be of different magnitudes depending on a stage of the build cycle. For example, the force may be dynamic when the actuator 150 is moving the build platform 140 (such as during pre-exposure movement intervals 342a and 342b and post-exposure movement intervals 362a and 362b shown in FIG. 17), but static when the actuator 150 is not moving the build platform 140 but still exerting a force on the interface assembly 160 (such as at exposure stop times 353a and 353b shown in FIG. 17). The force may also be exerted in both the downward direction 154 and the upward direction 152 depending on the stage of the build cycle. For example, the force may be a compressive force exerted in the downward direction 154 during the pre-exposure stage (such as the pre-exposure stages 340a and 340b shown in FIG. 17), but may be a tension force exerted in the upward direction 152 during the post-exposure stage (such as the post-exposure stages 360a and 360b shown in FIG. 17) as a newly polymerized layer 122 adheres to the build surface 164 (best shown in FIG. 18C) before being separated therefrom. Further, the force may be exerted at a single location or at multiple locations across the build surface 164 during a particular build cycle, depending on a shape and configuration of the layer 122 to be formed for example. The force may also be exerted at different locations across the build surface 164 during a build process, depending again on the shape and configuration of the different layers 122 formed during different build cycles of the build process.

The force exerted on the interface assembly 160 may also be caused by the polymerization of the feedstock 110 during a build cycle. For example, polymerization of the liquid feedstock 110 into the solid layer 122 can result in a local pressure drop in a volume confined by the newly polymerized solid layer 122 and build surface 164, which may cause a transient vacuum effect that exerts a force on the interface assembly 160. Additionally, the interface assembly 160 may also experience internal strain and stress forces caused at least in part by a flexibility and elasticity of the interface assembly 160 and a tendency of the interface assembly 160 to return to its original shape and configuration after a force exerted thereon (such as the compressive force or the tension force exerted by movement of the build platform 140 by the actuator 150) is no longer present.

The forces exerted on (or otherwise experienced by) the interface assembly 160 may also be repeated over the plurality of build cycles of the build process, and over multiple build processes. As such, the sensor 170 may also be constructed or configured to withstand a repeated forces without significant degradation of its material property characteristics, and may be required to satisfy a flexibility threshold. The flexibility threshold may be defined by one or more of a modulus criteria, a radius of curvature criteria and a durability criteria. In other embodiments, the flexibility threshold may include fewer or additional criteria.

A material may be tested in a flexure test to determine flexural (bending) properties from a stress-strain curve for the material. The flexure test may be conducted according to a three-point bend test as outlined in ISO 178 or in ASTM D790 for example. A modulus (i.e. modulus of elasticity or flexural modulus) of the material is defined as the ability of the material to bend prior to a yield point, and can be determined by determining a slope of an initial linear portion of the stress-strain curve. The sensor 170 may satisfy the modulus criteria when it has a flexural modulus of less than 5 gigapascals (GPa). In other embodiments, the sensor 170 may satisfy the modulus criteria if it has a flexural modulus of less than 6 GPa, less than 4 GPa or less than 3 GPa.

The radius of curvature of a material is defined as a ratio of the modulus of elasticity of the material relative to a bending moment experienced by the material. The sensor 170 may satisfy the radius of curvature criteria if it has a radius of curvature equal to or less than 7 mm. In other embodiments, the sensor 170 may satisfy the radius of curvature criteria if it has a threshold radius of curvature equal to or less than 6 mm, equal to or less than 5 mm or equal to or less than 8 mm.

As described above, the material properties of the sensor 170 include the temperature sensitivity properties (satisfies the temperature sensitivity threshold including the coefficient criteria, the linearity criteria and the precision criteria) and the optical transmittance properties (satisfies the transparency threshold including the total transmittance criteria, the transmission haze criteria and the transmission clarity criteria for example). The sensor 170 may satisfy the durability criteria if it maintains such material properties within a reasonable deviation after repeated forces are exerted thereon during a plurality of build cycles and over multiple build processes. For example, the sensor 170 may satisfy the durability criteria if it maintains ±20% variation for at least one material property (such as ±20% of a particular temperature coefficient of resistance (coefficient criteria), ±20% of at least 50% total transmittance (total transmittance criteria), ±20% of less than 30% wide-angle scatter (transmission haze criteria) or ±20% of less than 50% narrow-angle scatter (transmission clarity criteria)) after at least 10,000 build cycles. In other embodiments, the sensor 170 may satisfy the durability criteria if it maintains ±30% variation for at least one material property, ±10% variation for at least one material property, or ±5% variation for at least one material property after at least 10,000 build cycles.

The flexibility threshold including the modulus criteria, radius of curvature criteria and durability criteria, may be applied to the sensor 170 alone, such that only the flexibility and durability of the sensor 170 is assessed to determine whether the flexibility threshold is satisfied. In other embodiments, the flexibility threshold may be applied to the entire interface assembly 160, such that the combination of layers within the interface assembly 160 (such as the combination of one or more of the sensor 170, the at least one separating layer 260, the at least one structural layer 270 and the heating source 280 shown in FIGS. 10-16) are required to collectively satisfy the flexibility threshold (and in particular the modulus criteria, the radius of curvature criteria and the durability criteria as it relates to the optical transmittance properties). In such embodiments, the flexibility and durability of the entire interface assembly 160 may be assessed to determine whether the flexibility threshold is satisfied. In embodiments where the bottom wall 106 is flexible, the flexibility threshold may also be applied to a combination of the entire interface assembly 160 and the bottom wall 106, such that the combination of the layers of the interface assembly 160 and the bottom wall 106 are required to collectively satisfy the flexibility threshold, and the flexibility and durability of the combination of the bottom wall 106 and the interface assembly 160 may be assessed to determine whether the flexibility threshold is satisfied.

The sensor 170 may satisfy the temperature sensitivity threshold, the transparency threshold and the flexibility threshold by its construction or its configuration. For example, in the embodiment shown in FIGS. 3 and 4A-4I, the sensor 170 is a resistance-based sensor 170*a* comprising a conductive film 180. The conductive film 180 includes conductive material 182 and a carrier 184. The top surface of the conductive film 180 forms the sensor interface 176.

Non-limiting examples of the conductive material 182 include one or more of poly(3,4-ethylenedioxythiophene) polystyrene sulfonate (PEDOT:PSS), carbon, graphene, metal (silver, gold or copper for example) and metal alloy (cupronickel or silver alloy for example). Different types of material may have different conductivity (carbon may have a lower conductivity than a similar amount of metal or metal alloy for example), and the type of conductive material 182 may be selected to provide the conductive film 180 with a selected conductivity to allow the resulting sensor 170*a* to satisfy the temperature sensitivity threshold required for use in the device 100.

The conductive material 182 may be dimensioned to be smaller than a pixel size of the radiation projected by the projector or smaller than a diameter of a beam of radiation emitted by the laser onto the build area 108. Using conductive material 182 dimensioned to be smaller than a pixel size or a diameter of the beam can provide the conductive film 180 with optical transmittance to allow the resulting sensor 170*a* to satisfy the transparency threshold required for use in the device 100. For example, the conductive material 182 may be dimensioned as microstructures or nanostructures, including without limitation:

a. 0 dimensional ("0D") nanostructures, such as nanoparticles and nanocubes;

b. one-dimensional ("1D") nanostructures, such as nanowires, nanotubes, nanofibers; and c. two-dimensional ("2D") nanostructures, such as nanosheets, nanoflakes, nanoplates.

Figure 4A:
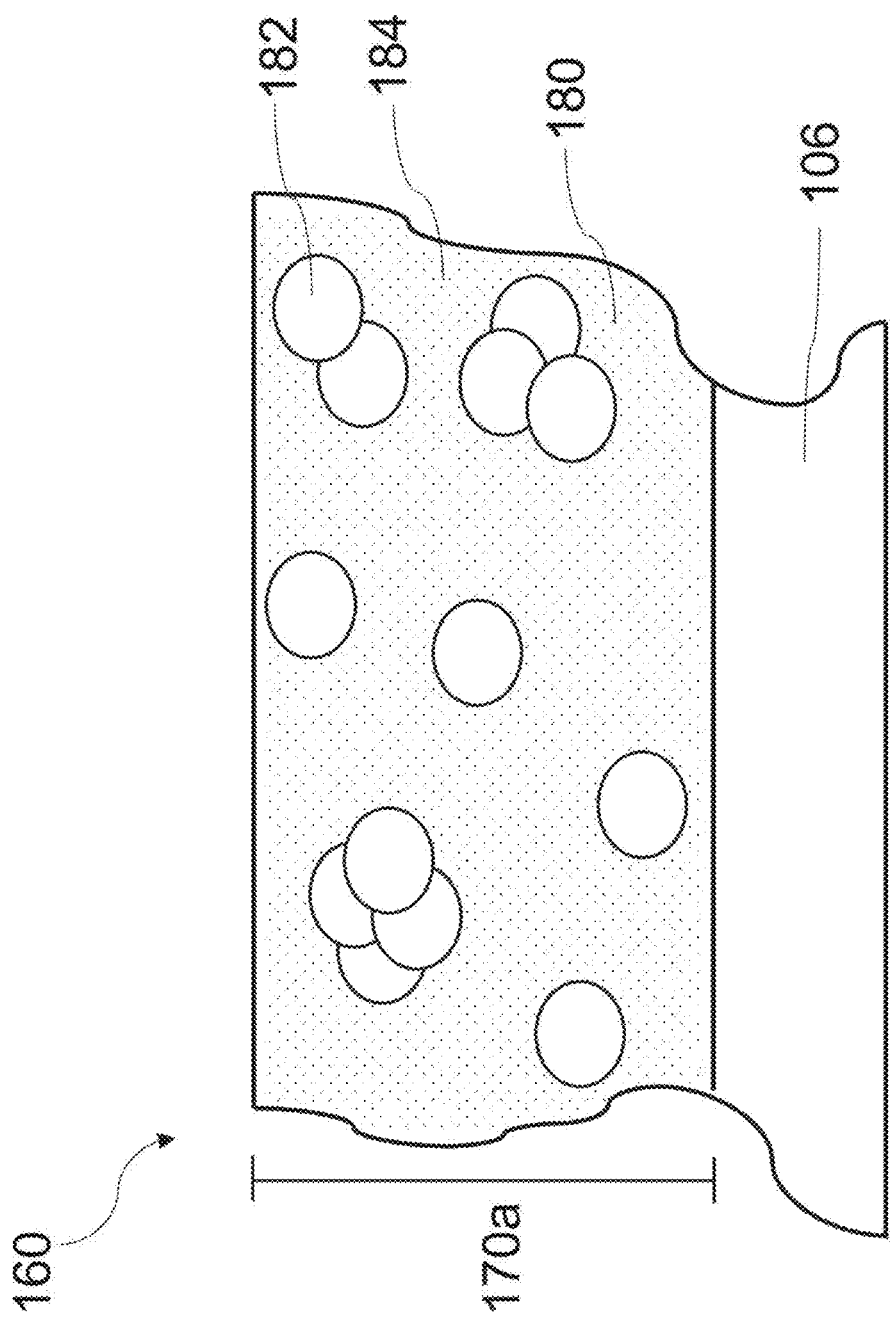
FIGS. 4A-4I are enlarged views of a sensor of the interface assembly of FIG. 3 according to different embodiments.
Figure 4B:
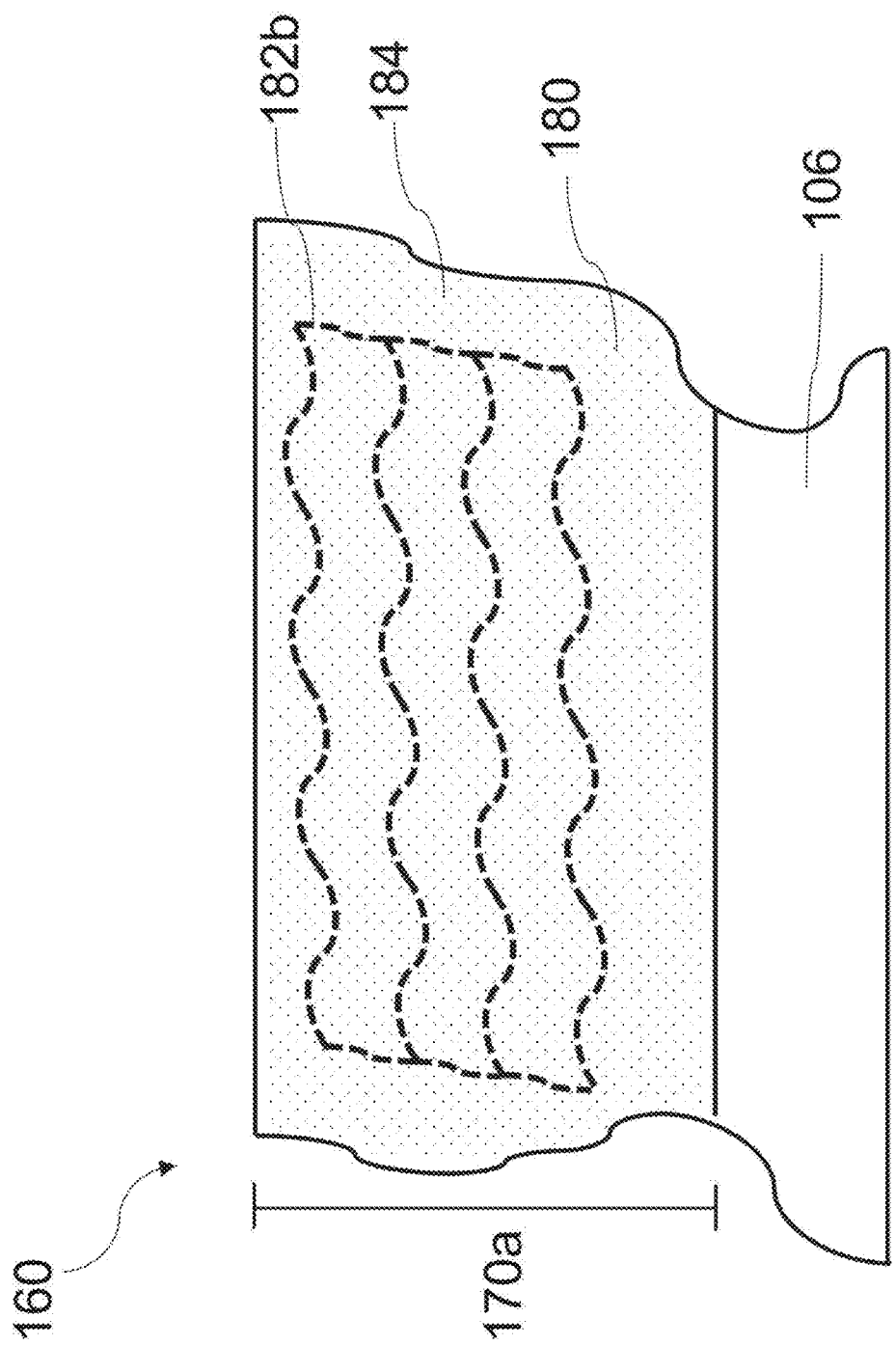
Figure 4C:
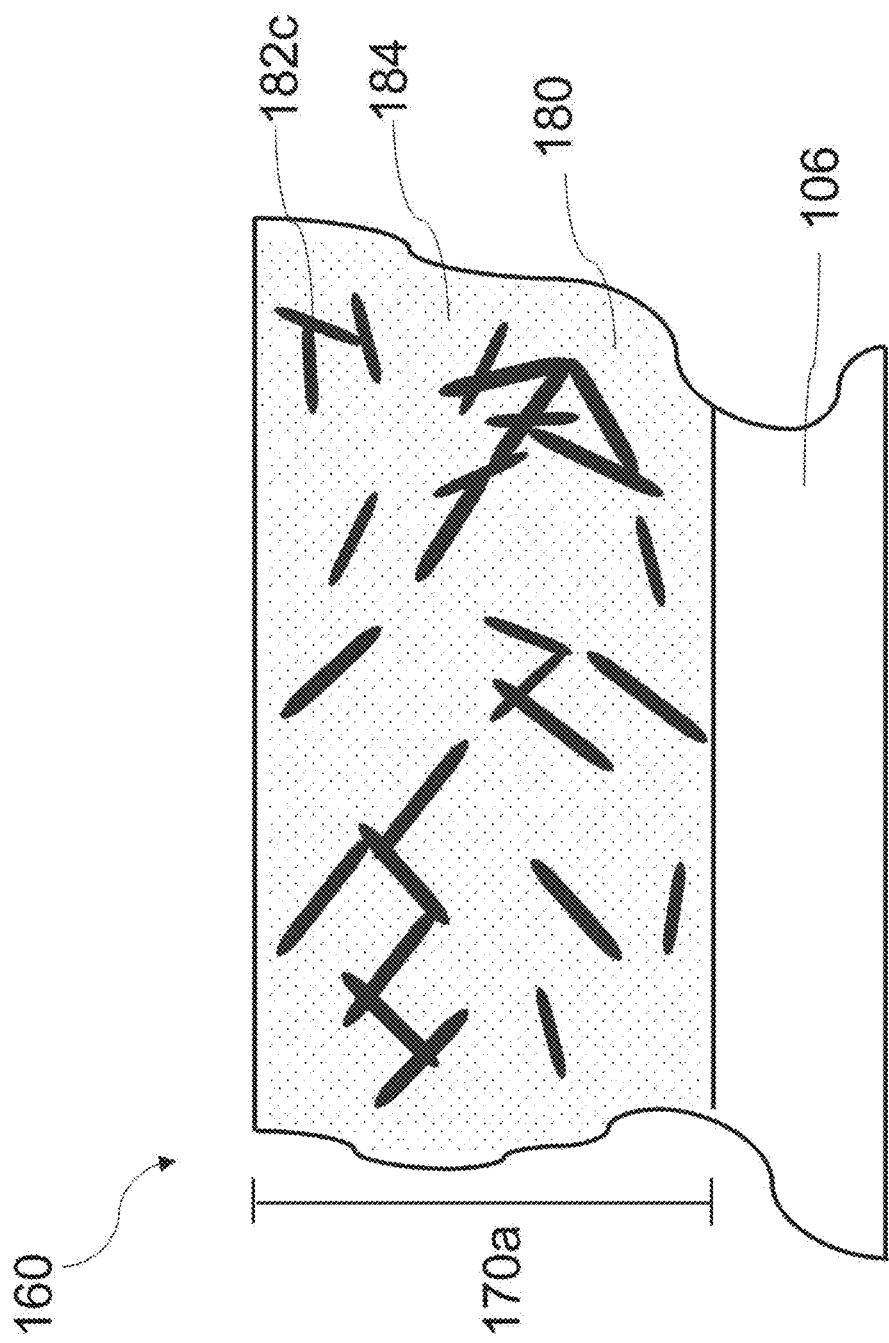
Figure 4D:
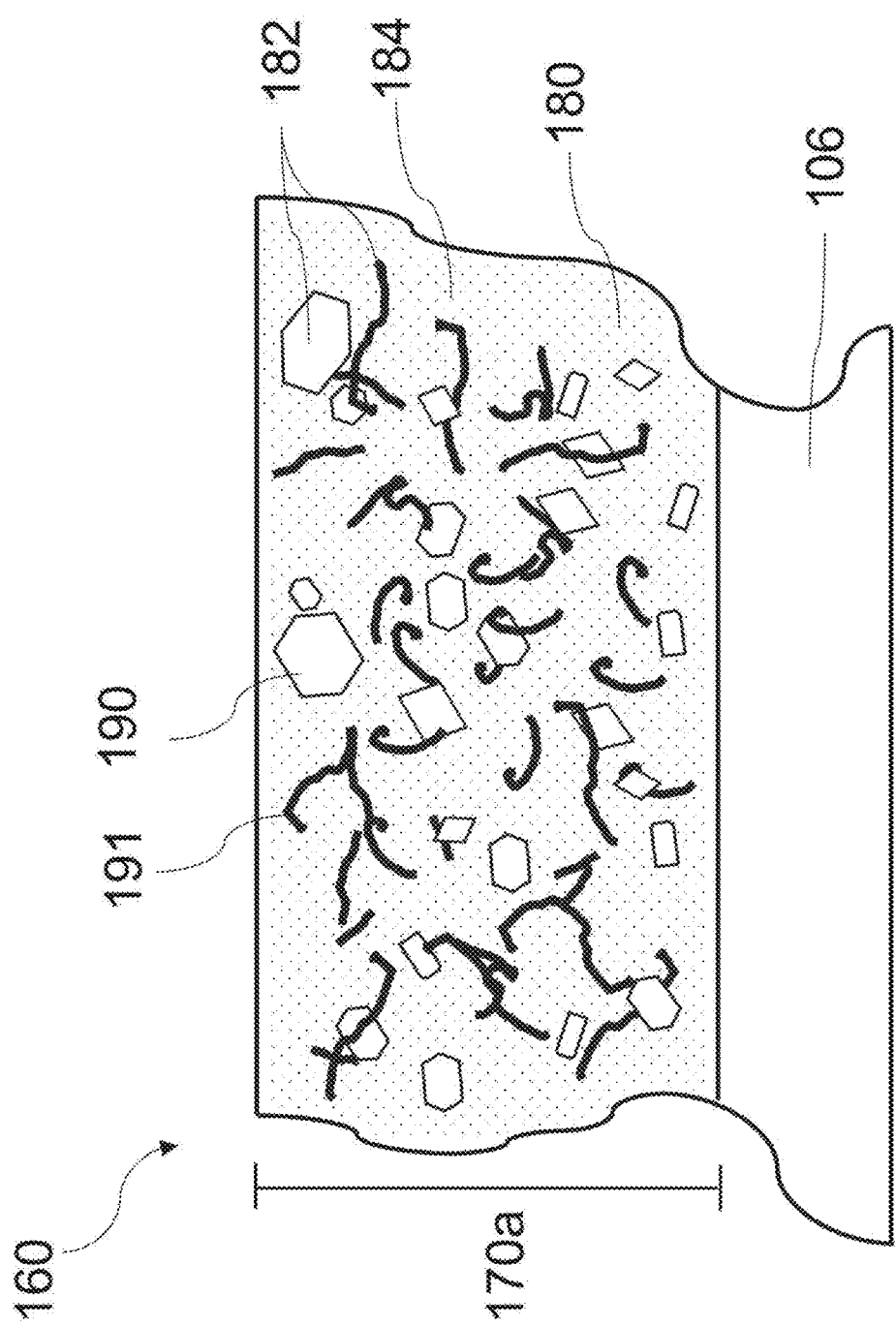
Figure 4E:
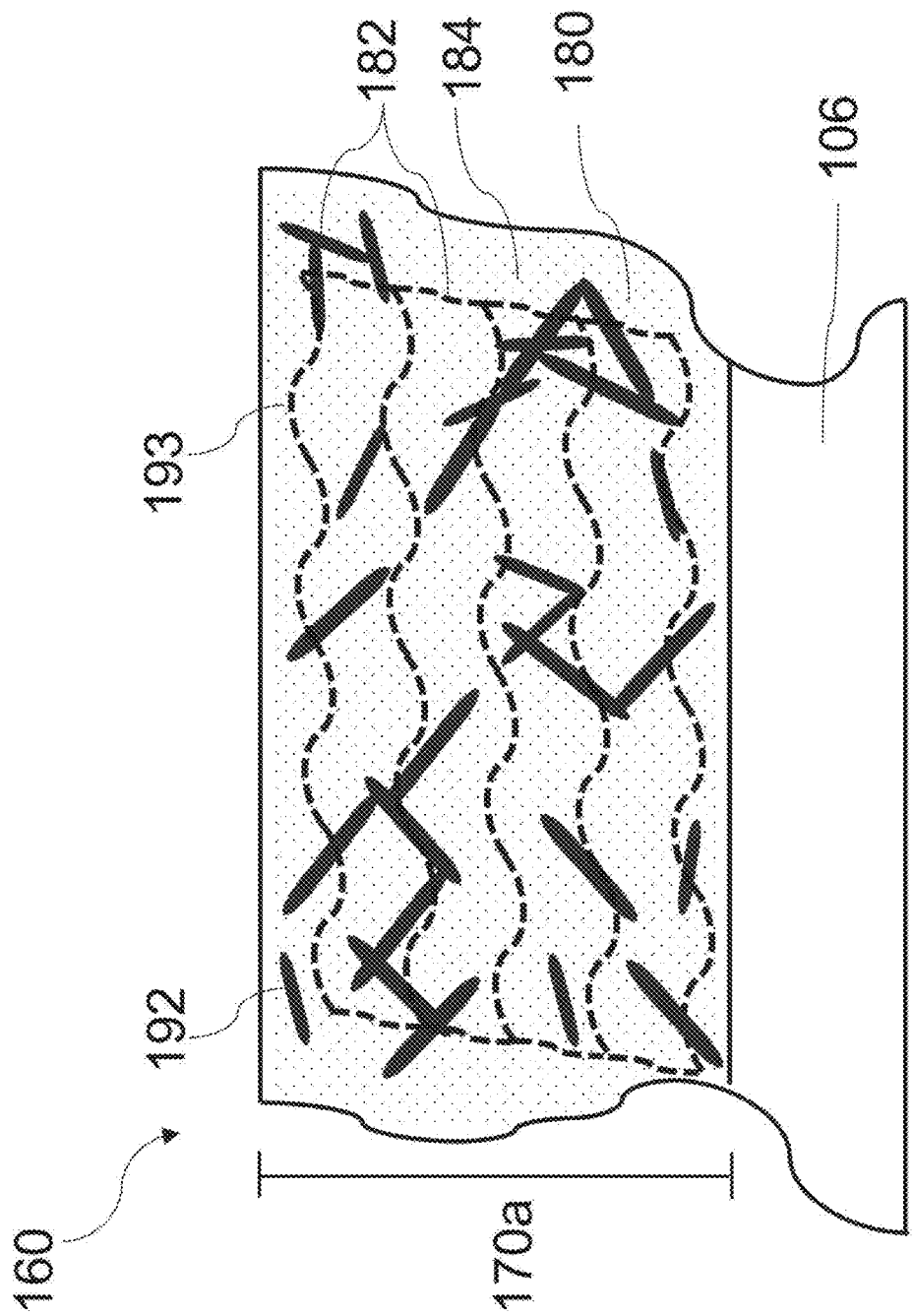
Figure 4F:
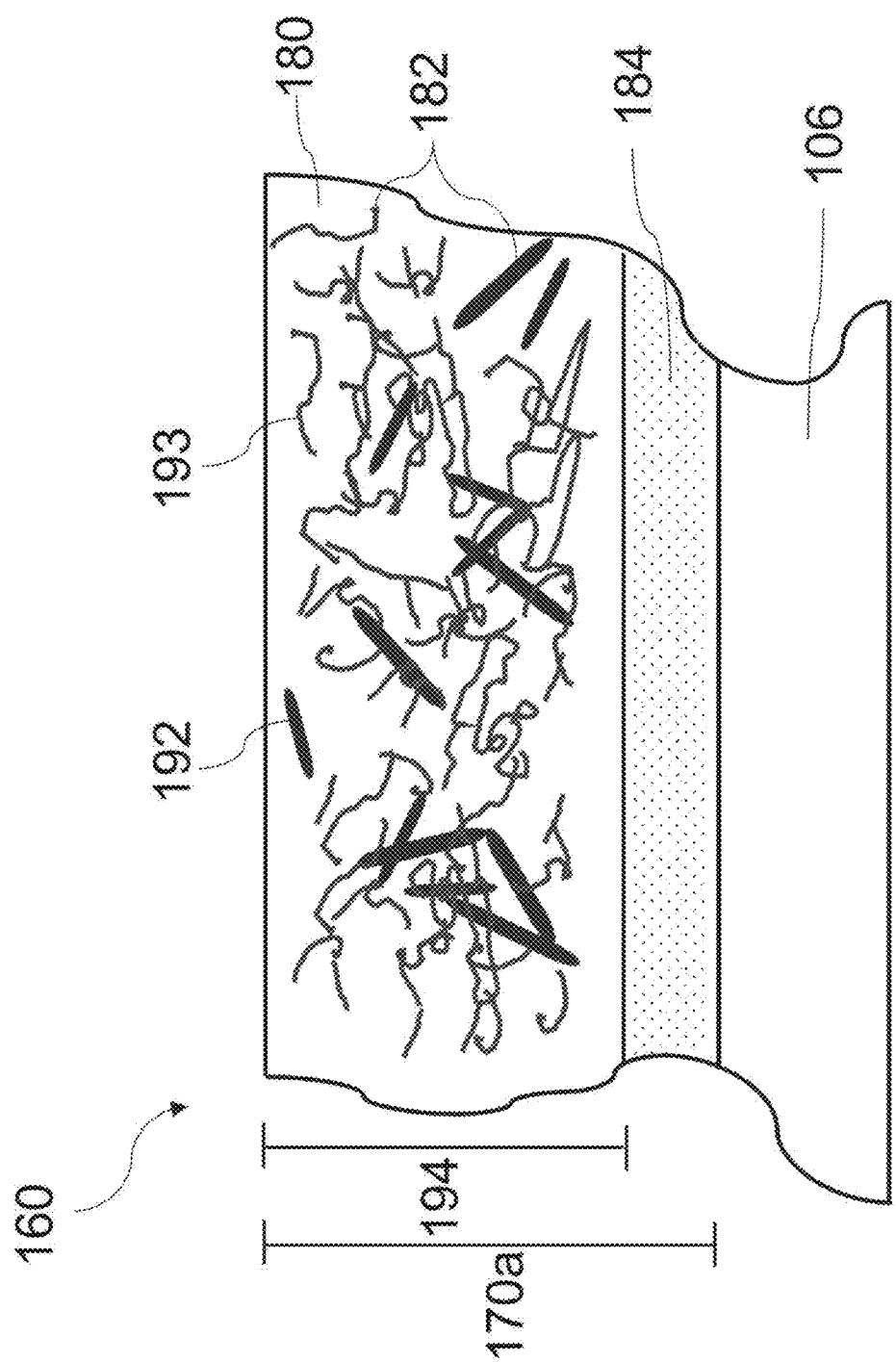
Figure 4G:
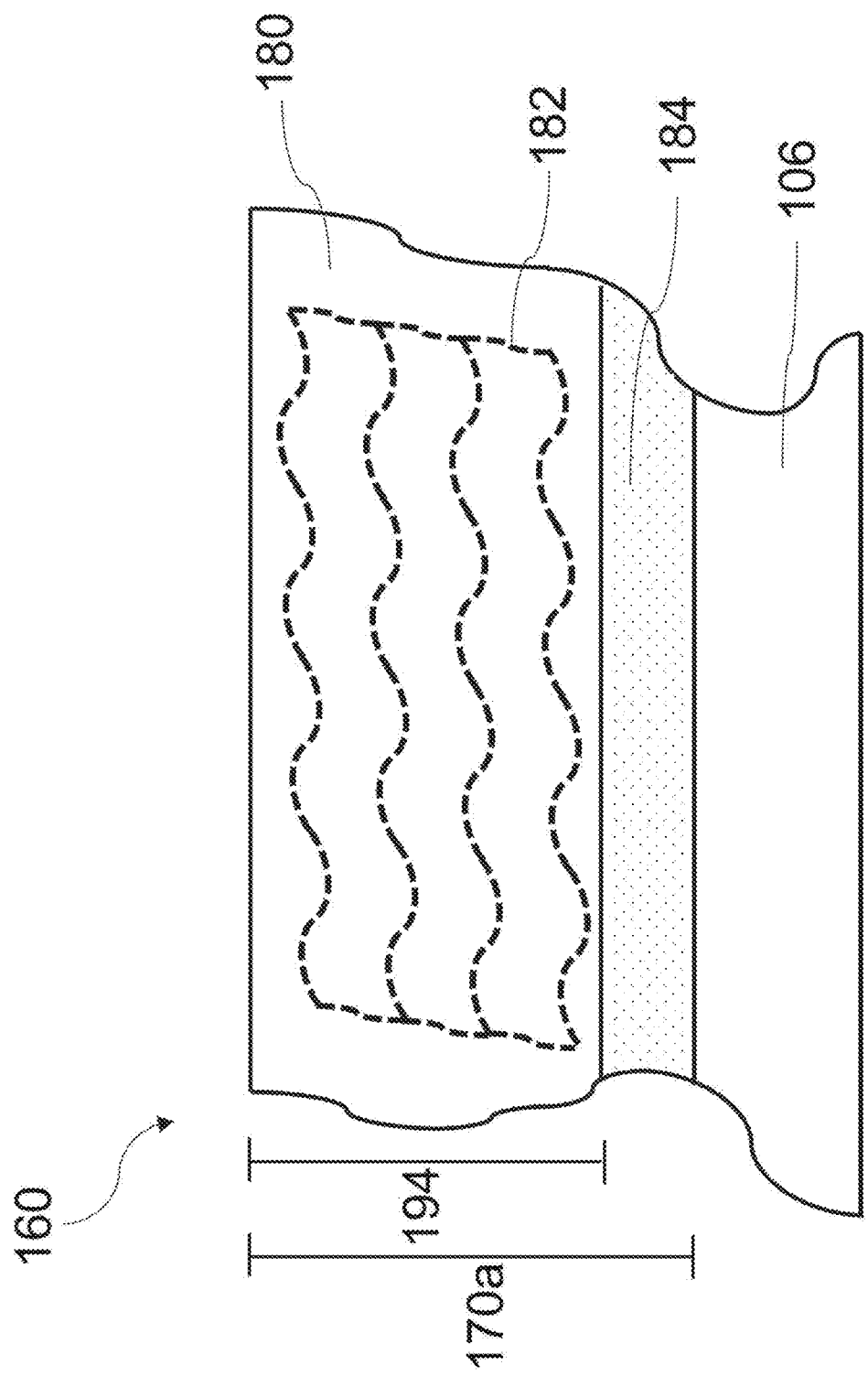

For example, in the embodiment shown in FIG. 4B, the conductive material 182 comprises a copper metal-based microwire or nanowire 182*b* having a diameter less than 100 μm, which may be constructed in a regular pattern. Alternatively, in the embodiment shown in FIG. 4C, the conductive material 182 comprises carbon nanotubes 182*c*, which may be constructed in a random network. In other embodiments, the conductive material 182 may be different materials having different nanostructures.

The conductive material 182 may also comprise more than one type of nanostructure, and may include a conductive material having a first nanostructure 190 and the conductive material having a second nanostructure 191. Combining conductive materials 182 having different types of nanostructures in the conductive film 180, and in particular combining nanostructures having different dimensions (i.e., 0D nanostructures combined with either 1D or 2D nanostructures, or 1D nanostructures combined with either 0D or 2D nanostructures), may provide the conductive film 180 with flexibility and durability to allow the resulting sensor 170*a* to satisfy the flexibility threshold required for use in the device 100. For example, in the embodiment shown in FIG. 4D, the conductive material 182 comprises silver, the first nanostructure 190 comprises 2D nanoflakes and the second nanostructure 191 comprises 1D silver nanowires. Other embodiments of the conductive material 182 may comprise more than two types of nanostructures, more than three types of nanostructures or more than four types of nanostructures.

Additionally, the conductive material 182 may comprise more than one type of conductive material, and may include a first type 192 of the conductive material 182 and a second type 193 of the conductive material 182. Combining different types of the conductive materials 182 in the conductive film 180 may: (a) provide the conductive film 180 with flexibility and durability to allow the resulting sensor 170*a* to satisfy the flexibility threshold required for use in the device 100, and (b) allow more granular adjustment of the conductivity, resistance and temperature coefficient of resistance of the conductive film 180 to allow the resulting sensor 170*a* to satisfy the temperature sensitivity threshold required for use in the device 100. In the embodiment shown in FIG. 4E, the first type 192 of the conductive material 182 comprises carbon and specifically carbon nanotubes, and the second type 193 of the conductive material 182 comprises copper and/or nickel and specifically copper microwires. The second type 193 of the conductive material 182 may be constructed in a regular pattern while the first type 192 of the conductive material 182 may be constructed as a random network. The carbon nanotubes and the nickel or copper microwires may be pressed rolled together. Alternatively, in the embodiment shown in FIG. 4F, the first type 192 of the conductive material 182 comprises carbon and specifically carbon nanotubes, and the second type 193 of the conductive material 182 comprises silver and specifically a matrix of silver nanowires. The matrix of nanowires may be arranged in a substantially continuous network, and the nanotubes may be deposited on or into the network, such that the conductive material 182 has a substantially uniform thickness 194 across the sensor area 172. Examples of carbon nanotubes include Chasm-AgeNT-VC200 and Chasm-AgeNT-VC201 carbon nanotube ink. Examples of silver and copper nanowires include Chasm-AgeNT-AM210 copper wire mesh, Chasm-AgeNT-AW121 silver nanowire, Chasm-AgeNT-AW210 silver nanowire and Dycotec Material DM-SNW-8010S silver nanowires. Other embodiments of the conductive material 182 may comprise more than two different types of conductive material, or more than three different types of conductive material or more than four different types of conductive material.

As shown in the embodiments of FIGS. 4A-4G, the conductive material 182 may be deposited onto, embedded in or on, or otherwise supported by the carrier 184. For example, the conductive material 182 may be deposited into or on the carrier 184 by one or more of sputtering, ion plating, ultrasonic atomization spraying, screen printing and vapor deposition. Additionally, the conductive material 182 may be present in the conductive film 180 at a specific amount or in a specific concentration or at a specific thickness. The application method, the amount, the concentration and the thickness of the conductive material 182 can affect one or more of the conductivity, resistance, temperature coefficient of resistance, transmittance, flexibility and durability of the conductive film 180, and may each be selected to provide the conductive film 180 with one or more of (a) a specific conductivity, resistance and temperature coefficient of resistance to allow the resulting sensor 170a to satisfy the temperature sensitivity threshold, (b) a specific transmittance to allow the resulting sensor 170a to satisfy the transparency threshold, and (c) specific flexibility and durability to allow the resulting sensor 170a to satisfy the flexibility threshold required for use in the device 100. For example, in the embodiment shown in FIG. 4F, the conductive material 182 comprises the matrix of metallic nanowires applied as a continuous network on the carrier 184 across the sensor area 172. The continuous network may enable the conductive film 180 to maintain its temperature sensitivity properties during a plurality of build cycles and over multiple build processes, which may allow the resulting sensor 170a to satisfy the flexibility threshold (in particular the durability criteria) required for use in the device 100. In this respect, the continuous network of metallic nanowires may have greater durability than a random deposit of metallic nanowires, as a random deposit may lose connectivity at junctions after repeated forces are exerted thereon. The loss of connectivity can result in a corresponding loss of electrical conductivity, a change in resistance and a change in the temperature coefficient of resistance. As an additional example, in the embodiments shown in FIGS. 4F and 4G, the conductive material 182 may be applied in a layer of substantially uniform thickness 194 across the sensor area 172. The substantially uniform thickness 194 of the conductive material 182 can provide the conductive film 180 with more consistent electrical conductivity across the sensor area 172 and maintain its temperature sensitivity properties during a plurality of build cycles and over multiple build processes, which may allow the resulting sensor 170a to satisfy the temperature sensitivity threshold and the flexibility threshold required for use in the device 100.

Non-limiting examples of material which may form the carrier 184 include silicone, glass, polyester terephthalate (PET), polycarbonate (PC), polyimide, fluorinated ethylene propylene (FEP), polytetrafluoroethylene (PTFE), polyethylene napthalate (PEN), polyacrylate, acrylic, polyester, triacetate, polyethylene (PE), cyclic olefin polymer (COP), cyclic olefin copolymer (COC) and polypropylene (PP). Different types of material may have different conductivity, different resistance, different temperature coefficients of resistance, different transmittance, different flexibility and different durability. The material of the carrier 184 may be selected, in combination with the conductive material 182, to provide the conductive film 180 with one or more of (a) a specific conductivity, resistance and temperature coefficient of resistance to allow the resulting sensor 170a to satisfy the temperature sensitivity threshold, (b) a specific transmittance to allow the resulting sensor 170a to satisfy the transparency threshold, and (c) specific flexibility and durability to allow the resulting sensor 170a to satisfy the flexibility threshold required for use in the device 100.

In some embodiments, the conductive film 180 may be existing conductive films. Examples include:
Kodak HCF film/ESTAR base coated with PEDOT:PSS;
TDK Ag-stacked film with Ag alloy (having a sheet resistance of $9\Omega/°$ C.);
Minco Thermal-Clear™ with 20 μm diameter resistive wire;
Canatu Carbon nanobud CNB™ film with elastic carbon nanotube;
Chasm transparent film AgeNT-10, AgeNT-30, AgeNT-75;
Chasm AgeNT-1 hybrid transparent conductive film;
Microcontinuum™ nanoMesh transparent conductive film.

Figure 4H:
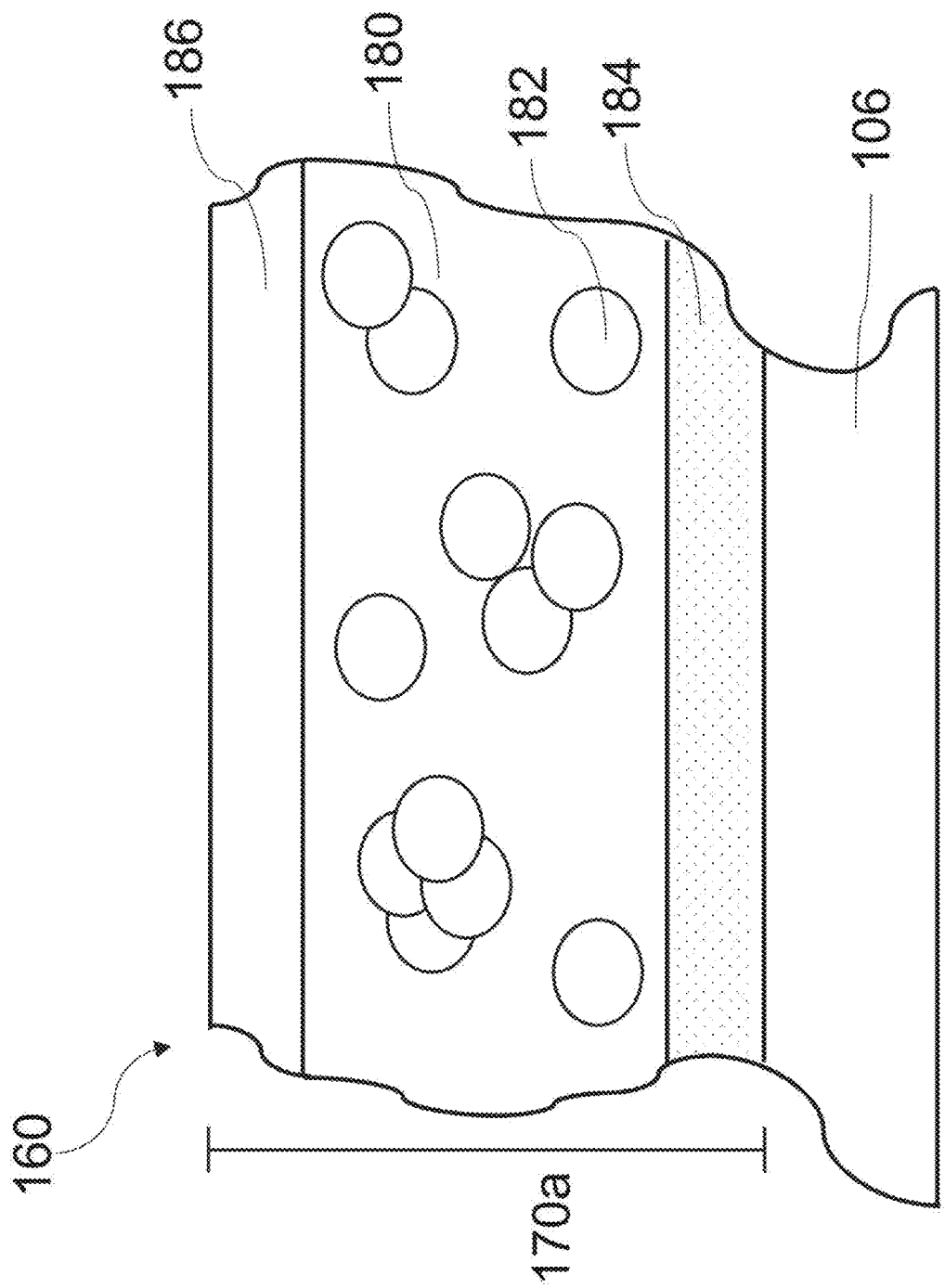

Referring now to FIG. 4H, some embodiments of the conductive film 180 also include a protective layer 186 positioned on top of the conductive material 182. The protective layer 186 may protect the conductive material 182 from being damaged or irreversibly deformed as forces are exerted on (or otherwise experienced by) the interface assembly 160 during a plurality of build cycles or over multiple build process. The protective layer 186 may also contribute to the flexibility and durability of the conductive film 180 by providing additional material strength. Non-limiting examples of material which can form the protective layer 186 comprise PET, PC, polyimide, FEP, PTFE, PEN, PE, polyacrylate, silicone, silicone hydrogel, polymethylpentene (TPX), Teflon AF2400, Teflon AF1600 and Dycotec Material DM-OC-6030S overcoat.

Figure 4I:
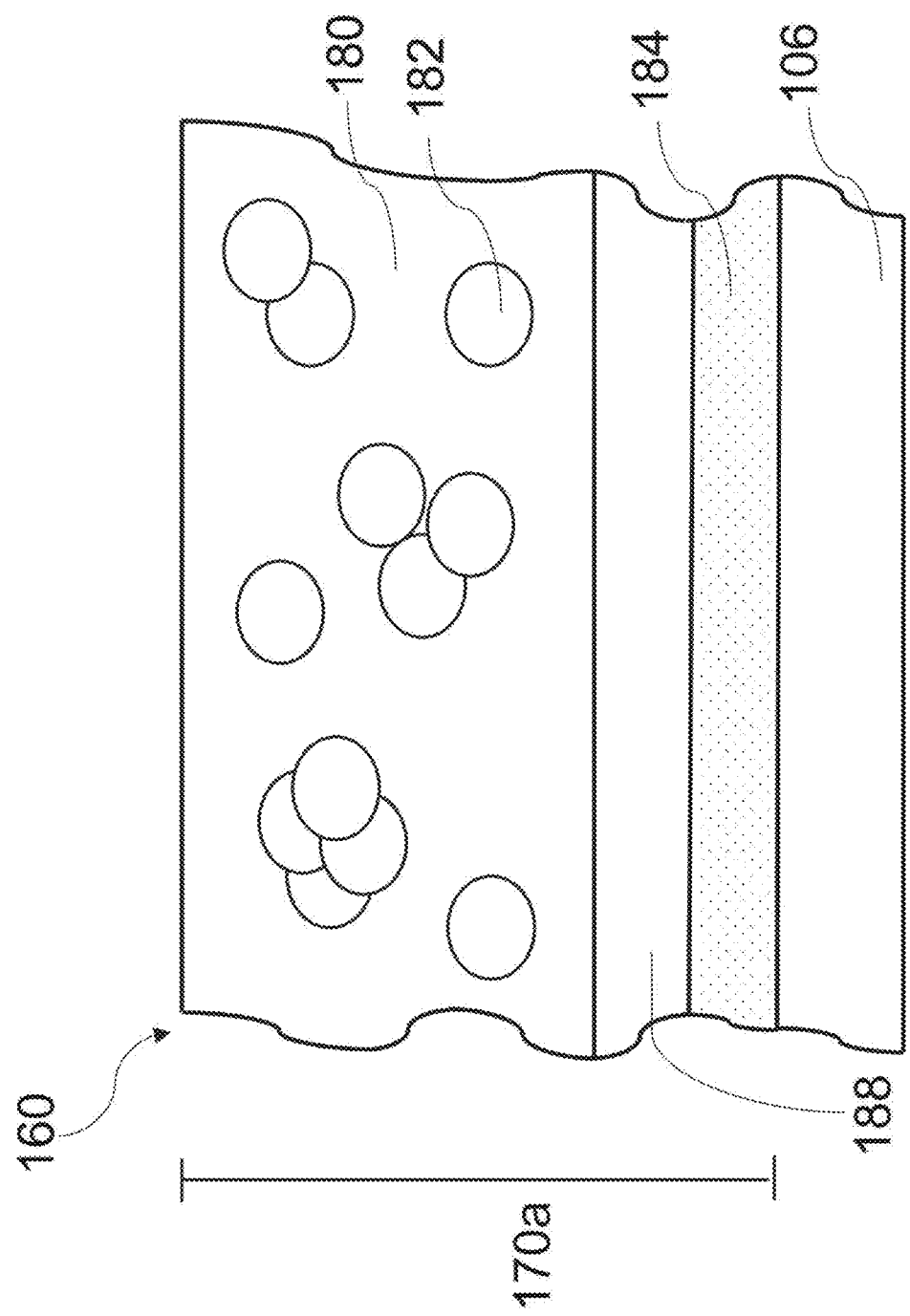

Referring now to FIG. 4I, some embodiments of the conductive film 180 may also include a dielectric layer 188 positioned between the conductive material 182 and the carrier 184. The dielectric layer 188 may insulate the conductive material 182 from the carrier 184 by preventing any flow of electrons from the conductive material 182 to the carrier 184. The dielectric layer 188 may improve the durability of the conductive film 180, and may also prevent the conductive film 180 from forming a short-circuit via the carrier 184. In other embodiments (not shown), the conductive film 180 may include dielectric material positioned between conductive material 182 within a single layer (such as between a plurality of sub-sensors 230a-230e shown in FIG. 8 and a plurality of sub-sensors 240a-240i shown in FIG. 9) or between different types of the conductive material 182 (such as between the first type 192 and the second type 193 of the conductive material 182 shown in FIGS. 4E and 4F). Non-limiting examples of material which can form the dielectric layer 188 include glass, polycarbonate, Teflon, polyimide, silicone, polyester and PTFE, with or without thermoset acrylic adhesive.

Figure 5:
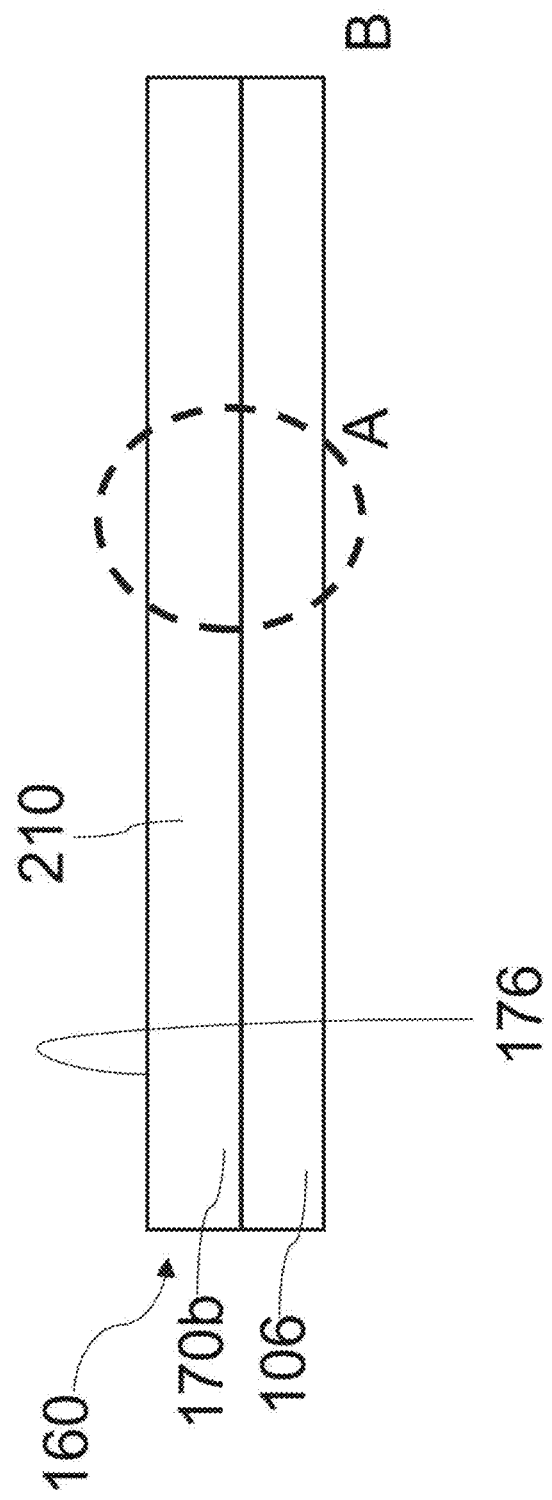
FIG. 5 is a schematic of the interface assembly of FIG. 2 according to another embodiment.
Figure 6A:
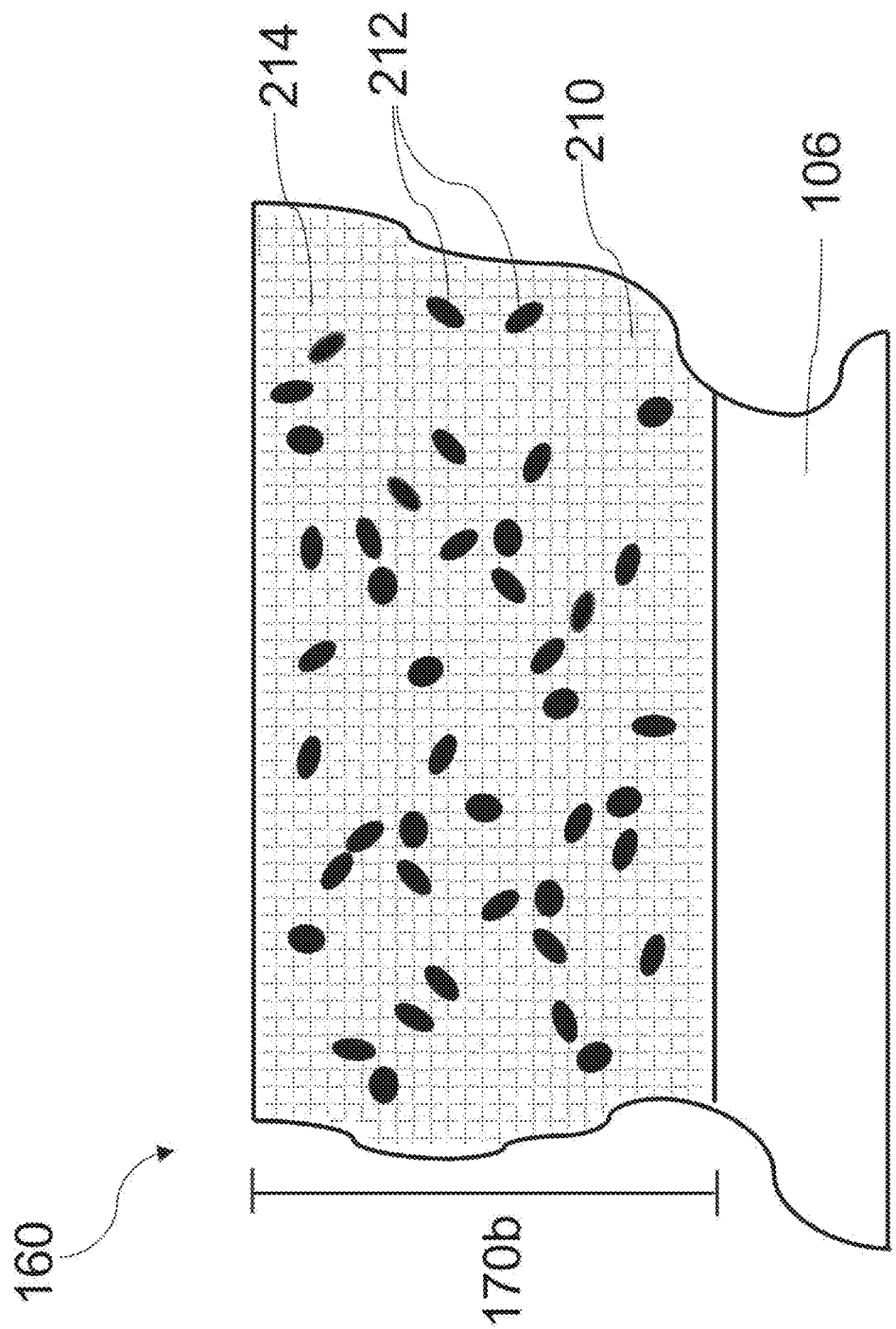
FIGS. 6A and 6B are enlarged views of a sensor of the interface assembly of FIG. 5 according to different embodiments.
Figure 6B:
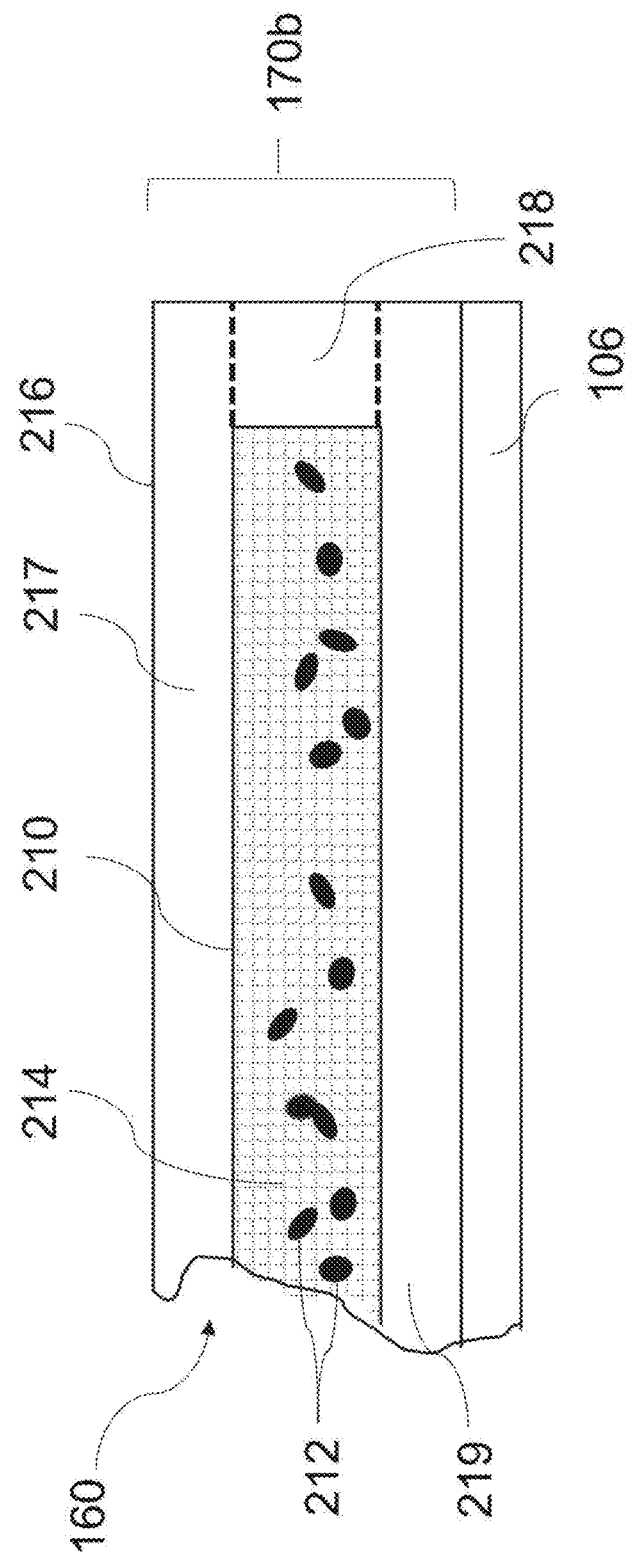

In another embodiment shown in FIGS. 5 and 6A-6B, the sensor 170 is a resistance-based sensor 170b comprising a conductive hydrogel 210. The conductive hydrogel 210 includes conductive ions 212 and a hydrogel carrier 214. A top surface of the conductive hydrogel 210 forms the sensor interface 176.

The conductive ions 212 may be freely suspended in the hydrogel carrier 214. For example, a salt including the conductive ions 212 may be dissolved in a precursor solution of the hydrogel carrier 214 prior to polymerization of the precursor solution to form the hydrogel carrier 214. Alternatively, the conductive ions 212 may instead be cross-linked with polymers of the hydrogel carrier 214 during polymerization. For example, certain hydrogel polymers may naturally cross-link conductive ions during its polymerization (alginate for example), and other hydrogel polymers may be chemically treated or heat-treated to force incorporation of conductive ions during its polymerization.

Non-limiting examples of conductive ions 212 include KCl, Sodium casein, LiCl, NaCl, $FeCl_3$, $H_2SO_4$, $Na_2HPO_4$, $Fe(NO_3)_3$, $CaCl_2$, $Na_2B_4O_7$ and $Fe^{3+}$. Different types of the conductive ions 212 may have different conductivity and resistance and may impart different temperature coefficient of resistance to the conductive hydrogel 210. The type of the conductive ions 212 may be selected to provide the conductive hydrogel 210 with a specific conductivity, a specific resistivity, and a specific temperature coefficient of resistance to allow the resulting sensor 170b to satisfy the temperature sensitivity threshold required for use in the device 100.

The conductive ions 212 may be added to the hydrogel carrier 214 such that the conductive ions 212 are present at a specific amount or in a specific concentration in the final conductive hydrogel 210. The amount and concentration of the conductive ions 212 can affect one or more of the conductivity, resistance, temperature coefficient of resistance, and transmittance of the conductive hydrogel 210. For example, a higher concentration of the conductive ions 212 may result in higher conductivity and lower resistance, but also lower transmittance. However, a low concentration of the conductive ions 212 may be insufficiently conductive for use as a temperature sensor. The amount and concentration of the conductive ions 212 may be selected to provide the conductive hydrogel 210 with (a) a specific conductivity, resistance and temperature coefficient of resistance to allow the resulting sensor 170b to satisfy the temperature sensitivity threshold, and (b) a specific transmittance to allow the resulting sensor 170b to satisfy the transparency threshold required for use in the device 100.

Additionally, some embodiments of the conductive hydrogel 210 may include more than one type of the conductive ions 212 (not shown). Combining different types of conductive ions 212 may allow more granular adjustment of the conductivity, resistance and temperature coefficient of resistance of the conductive hydrogel 210 to allow the resulting sensor 170b to satisfy the temperature sensitivity threshold required for use in the device 100.

Non-limiting examples of materials which may be used to form the hydrogel carrier 214 include polyacrylamide, polyethylene glycol, ethylene glycol, glycerol, cellulose, agar, alginate, carrageenan, polyvinylpyrrolidone, polyvinyl acetate, poly(vinyl alcohol), polyacrylic acid, dihydroxyacetone, polyacrylic acid-co-3-dimethyl (methacryloyloxyethyl) ammonium propane sulfonate (PAA-co-DMAPS). Different types of material may provide different conductivity, different resistance, different temperature coefficients of resistance, different transmittance, different flexibility and different durability. Thus, the material of the hydrogel carrier 214 may be selected, in combination with the type, amount and concentration of the conductive ions 212, to provide the conductive hydrogel 210 with one or more of (a) a specific conductivity, resistance and temperature coefficient of resistance to allow the resulting sensor 170b to satisfy the temperature sensitivity threshold, (b) a specific transmittance to allow the resulting sensor 170b to satisfy the transparency threshold, and (c) specific flexibility and durability to allow the resulting sensor 170b to satisfy the flexibility threshold required for use in the device 100.

For example, in some embodiments, the conductive ions 212 comprise 2 wt % LiCl dissolved in 90 wt % water, and the hydrogel carrier 214 comprises a polymer network of poly(vinyl alcohol) and borax. In such embodiments, the conductive ions $Li^+0$ and $Cl^-$ are suspended in the polymer network. In other embodiments, the conductive ions 212 comprise 1 wt % KCl dissolved in 81 wt % water, and the hydrogel carrier 214 comprises a first covalently cross-linked polymer network of polyacrylamide and a second ionically cross-linked polymer network of carrageenan. In such embodiments, the conductive ions $K^+$ and $Cl^-$ are ionically bound to the second polymer network.

Referring to FIG. 6B, in some embodiments of the sensor 170b, the conductive hydrogel 210 is encapsulated in a protective capsule 216. In the embodiment shown, the protective capsule 216 includes a top layer 217, a border layer 218, and a bottom layer 219. The protective capsule 216 may protect the conductive hydrogel 210 from being damaged or irreversibly deformed as forces are exerted on (or otherwise experienced by) the interface assembly 160 during a plurality of build cycles or over multiple build processes by providing structural integrity to the conductive hydrogel 210. The protective capsule 216 may also preserve a water content of the conductive hydrogel 210. The water content of the conductive hydrogel 210 may affect conductivity, resistance and temperature coefficient of resistance of the conductive hydrogel 210. As such, use of the protective capsule 216 may allow the resulting sensor 170b to satisfy the flexibility threshold and the temperature sensitivity threshold required for use in the device 100.

The top, border and bottom layers 217, 218 and 219 may be made of a same or a different material. Non-limiting examples of materials which can form the top layer 217 include PET, PC, polyimide, FEP, PTFE, PEN, PE, polyacrylate, silicone, silicone hydrogel, TPX, Teflon AF2400, Teflon AF1600 and Dycotec Material DM-OC-6030S overcoat. Non-limiting examples of materials which can form the border and bottom layers 218 and 219 include silicone, silicone hydrogel, glass, PET, PC, polyimide, FEP, PTFE, PEN, polyacrylate, acrylic, polyester, triacetate, PE and PP.

Figure 7:
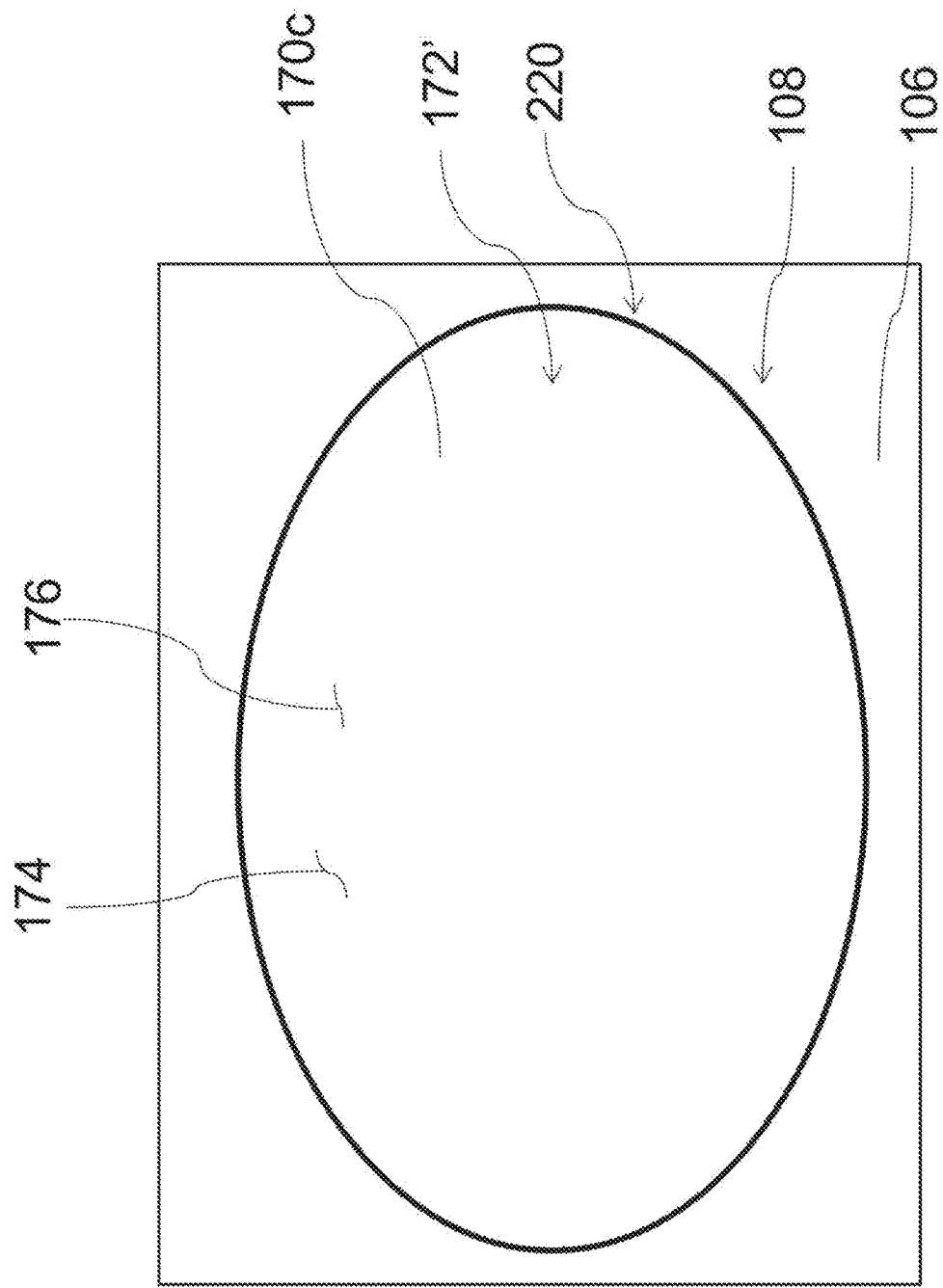
FIG. 7 is a plan view of an interface assembly of the additive manufacturing device of FIG. 1 according to another embodiment.

As described above, and referring back to FIG. 2, the sensor 170 is dimensioned to sense substantially the entire build area 108 and the sensor area 172 is dimensioned to substantially correspond to the build area 108. For example, the build area 108 may have a width of approximately 40 cm and a length of approximately 30 cm and the sensor area 172 may have a width of approximately 39 cm and a length of approximately 29 cm. In other embodiments, the sensor 170 may instead be dimensioned and positioned to sense the temperature at the reaction interface 112 over only a portion of the build area 108. Referring to FIG. 7, the sensor 170 comprises a smaller sensor 170c. The sensor 170c has a sensor area 172' smaller than the build area 108 defined by the bottom wall 106. In the embodiment shown, the sensor area 172' covers approximately 70% of the build area 108. In other embodiments, the sensor area 172' may cover at least 90%, at least 80%, at least 60% or at least 50% of the build area 108. Further, in the embodiment shown, the sensor area 172' has a substantially oval shape. In other embodiments, the sensor area 172' may have a circular, triangular, rectangular, square or a polygon shape instead. Similar to the sensor 170 shown in FIG. 2, the sensor 170c also has the top surface 174, and is constructed or configured to sense a temperature of material in contact with the top surface 174 such that the top surface 174 forms the sensor interface 176.

The sensor 170c may be positioned on the build area 108 to sense a temperature at the reaction interface 112 over a high-build region 220 of the build area 108 where polymerization of the feedstock 110 is expected to occur more frequently during a majority of possible build cycles when compared to other regions of the build area 108. In the embodiment shown, the high-build region 220 corresponds to a central region of the build area 108. In other embodiments, the high-build region 220 may correspond to peripheral regions of the build area 108. Reducing the sensor area 172' can reduce manufacturing costs for the sensor 170c, as less material is required for a smaller sensor. Further, restricting the sensor area 172' to the high-build region 220 may restrict the temperature measured by the sensor 170c to the reaction interface 112 over a relevant region of the build area 108, as opposed to measuring a temperature at the reaction interface 112 in regions where no polymerization is occurring. In this respect, certain types of feedstock 110 may inhibit heat transfer such that the temperature at the reaction interface 112 in one region of the build area 108 (such as a region having feedstock 110 which has undergone an exothermic polymerization reaction during a particular build cycle) is different from the temperature in another region (such as a region having feedstock 110 which has not undergone any polymerization reaction during that particular build cycle). In embodiments where the sensor 170 generates a sensed temperature based on an average temperature measured across the sensor interface 176, embodiments of the sensor 170 which measure the entire build area 108 may not provide an accurate assessment of potentially high-temperatures (such as at localized high-temperature regions) at the reaction interface 112. Restricting the temperature measured by the sensor 170c to the high-build region 220 may provide a more accurate assessment of potentially high-temperatures at the reaction interface 112.

The sensor 170 may comprise a plurality of sub-sensors each configured and positioned to sense a temperature at the reaction interface 112 over only a region 109 of the build area 108. For example, in the embodiment shown in FIG. 8, the sensor 170 is a sensor 170d comprising a plurality of sub-sensors 230a-230e having respective sub-sensor interfaces 236a-236e configured and positioned to sense a temperature at the reaction interface 112 over a respective one of a plurality of regions 109a-109e of the build area 108. Other embodiments may include more or fewer sub-sensors, and may include at least two, at least three, at least four, at least 10, at least 25, at least 50 and at least 100 sensors for example.

Each sub-sensor 230a-230e has a length and a width defining a respective sub-sensor area. In the embodiment shown in FIG. 8, the sub-sensor area corresponds to an area of the associated region 109a-109e that the sub-sensor 232a-232e is configured to sense. In other embodiments, the sub-sensor areas may be smaller than the areas of associated regions 109a-109e. Additionally, in the embodiment shown, the respective sub-sensor areas of each sub-sensor 230a-230e have substantially identical shapes and substantially similar dimensions, and are each a rectangle having a width of approximately 1 cm and a length of approximate 20 cm for example. In other embodiments, different sub-sensors may have different shapes and different dimensions from other sub-sensors (such as sub-sensors 240a-240i of sensor 170e shown in FIG. 9), and may have shapes and dimensions different than those described above.

The sub-sensors 230a-230e may provide an independent temperature measurement at the reaction interface 112 over each region 109a-109e, which may be sent to the controller 310 as respective independent temperature data signals 255. Using the sub-sensors 230a-230e can improve the granularity of temperatures measured across the build area 108 and can enable identification of regions 109a-109e which experience high-temperatures and low-temperatures during a particular build cycle or over multiple build cycles. The independent temperature data signals 255 may used by the controller 310 to control different components (such as the radiation source 130 or the heating source 280 shown in FIG. 1 for example) of the device 100 to address the specific temperature of a specific one of the regions 109a-109e.

Figure 9:
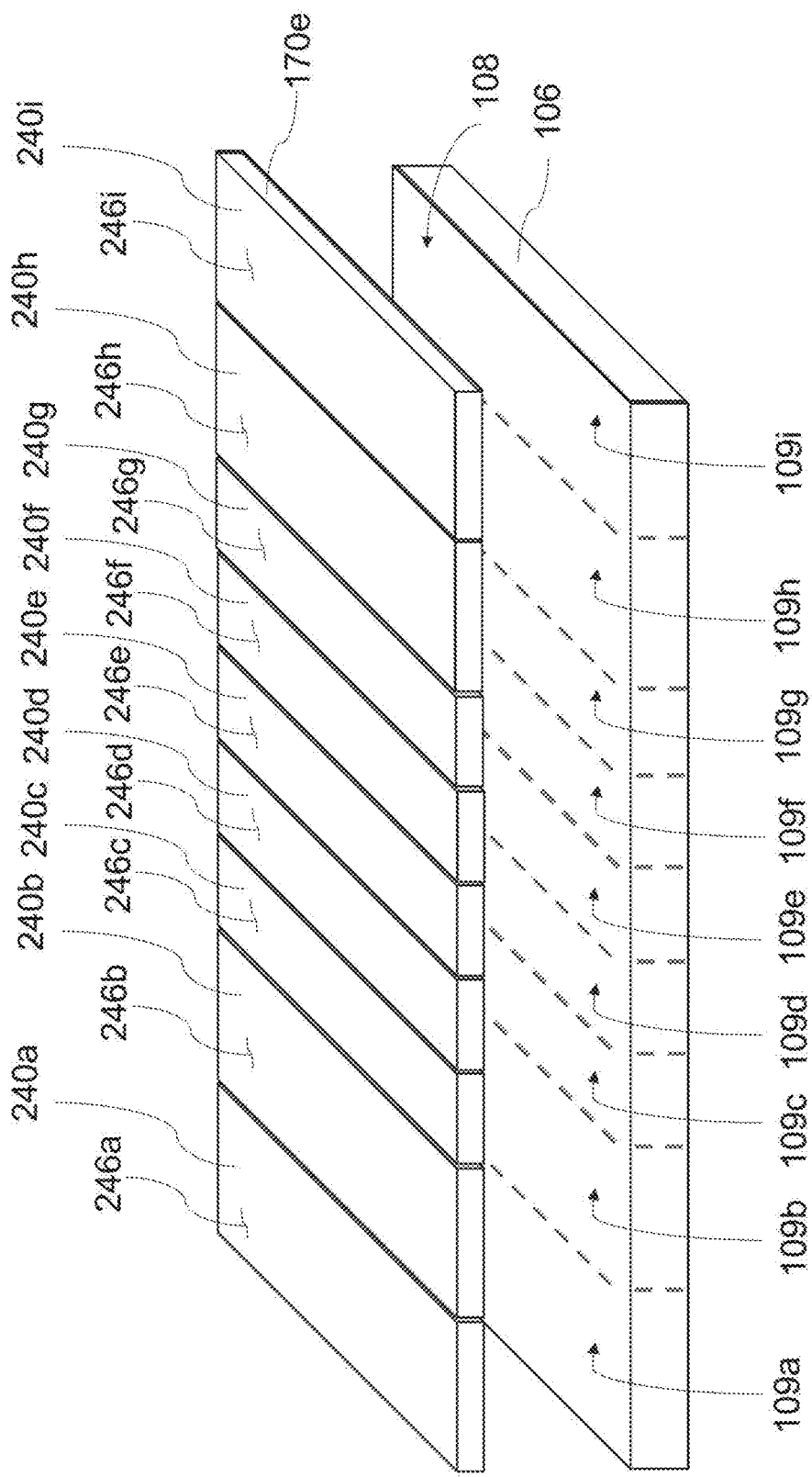
FIG. 9 is a perspective view of an interface assembly of the additive manufacturing device of FIG. 1 according to another embodiment.

As an additional example, in the embodiment shown in FIG. 9, the sensor 170 is the sensor 170e comprising the plurality of sub-sensors 240a-240i. The sub-sensors 240a-240i have respective sub-sensor interfaces 246a-246i configured and positioned to sense a temperature at the reaction interface 112 over a respective one of a plurality of region 109a-109i of the build area 108. The sensed temperatures for each respective region 109a-109i may be sent to the controller 310 as independent temperature data signals 255.

Figure 8:
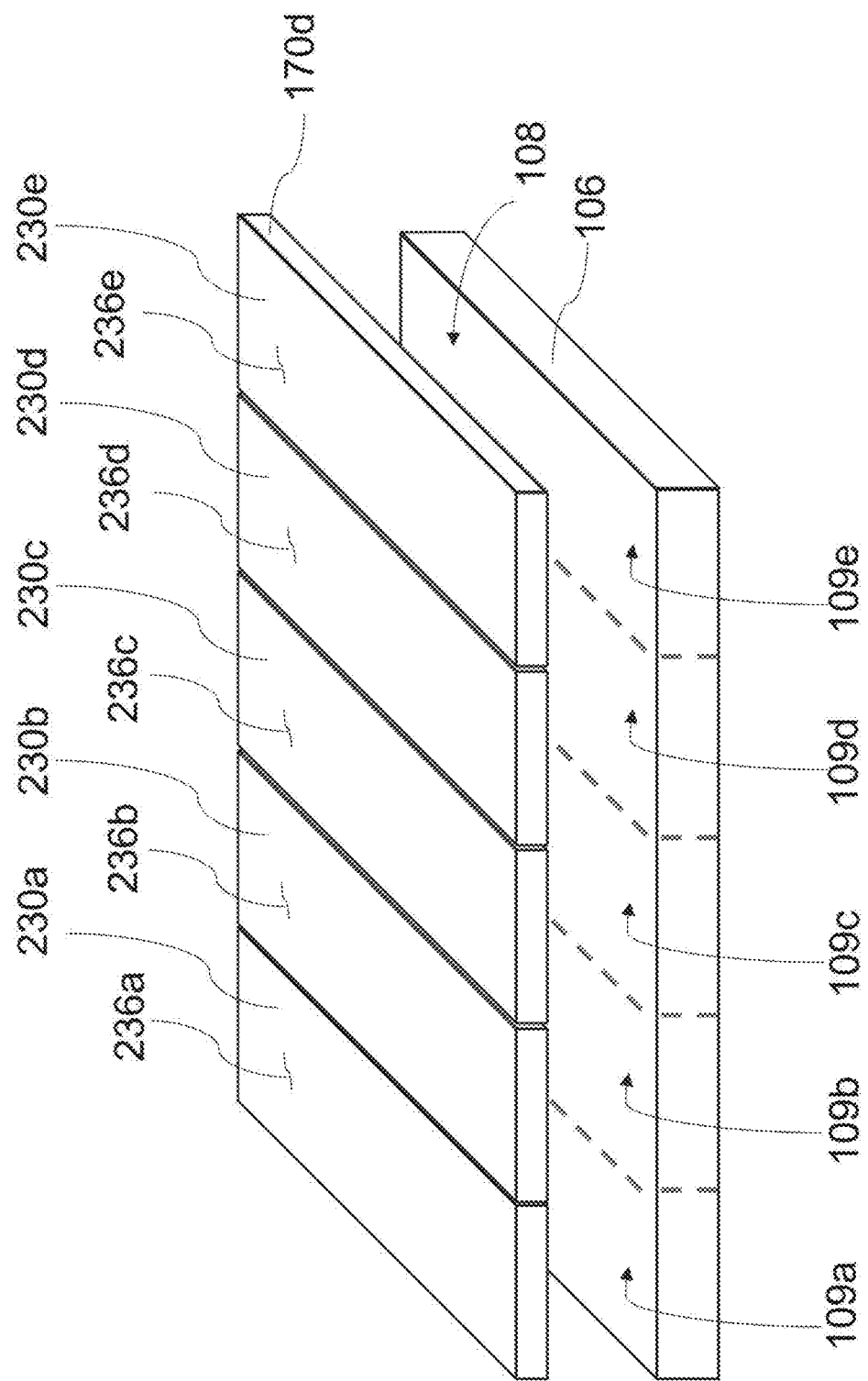
FIG. 8 is a perspective view of an interface assembly of the additive manufacturing device of FIG. 1 according to another embodiment.

Similar to sub-sensors 230a-230e shown in FIG. 8, each sub-sensor 240a-240i has a length and a width defining a respective sub-sensor area which generally correspond to an area of the associated region 109a-109i that the sub-sensor 240a-240i is configured to sense. However, unlike the sub-sensors 230a-230e, the sub-sensors 240a-240i have different dimensions relative to each other and may have different dimensions depending on its position in the build area 108. In the embodiment shown, the sub-sensors 240c-240g positioned at regions 109c-109g defining a middle of the build area 108 are dimensioned smaller than the sensors 240a, 240b, 240h and 240i positioned at regions 109a, 109b, 109h and 109i near a periphery of the build area 108. The sub-sensor density near the middle is thus greater than the sub-sensor density near the periphery, which may provide even more granular temperature measurements of the regions 109c-109g defining the middle of the build area 108. Such configurations of the sensor 170e may be used in embodiments where the middle of the build area 108 corresponds to a high-build region (similar to the high-build region 220 shown in FIG. 7) where polymerization of the feedstock 110 is expected to occur more frequently during a majority of potential build cycles. In other embodiments, sub-sensors may have shapes and dimensions different than those described above. For example, in other embodiments, sub-sensors may have a circular configuration or may include internal openings such that the sub-sensors are nested within each other.

In some embodiments, the at least one layer of the interface assembly 160 comprises more than one layer and may include layers additional to the sensor 170. For example, referring to FIGS. 10-12, some embodiments of the interface assembly 160 include at least one separating layer 260. The at least one separating layer 260 may be constructed and configured to protect other layers of the interface assembly 160 from damage as forces are exerted on (or otherwise experienced by) the interface assembly 160 during a plurality of build cycles and over multiple build processes and to reduce adherence of a newly polymerized layer 122 to the build surface 164.

Figure 10:
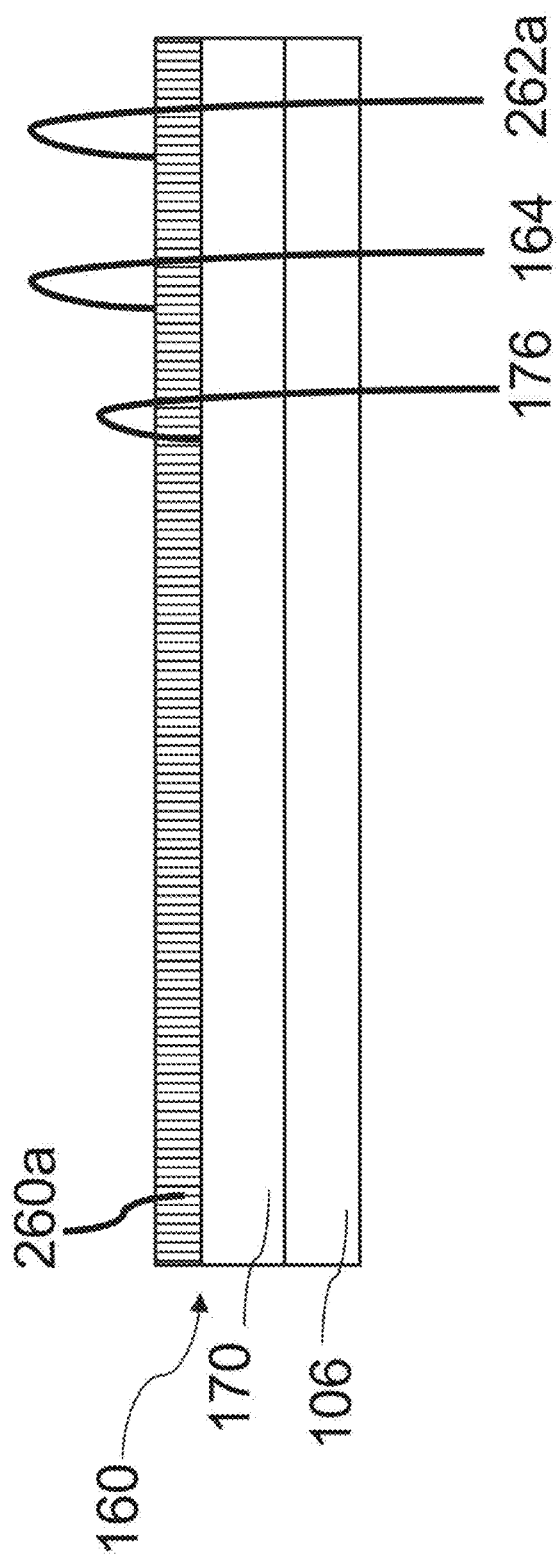
FIG. 10 is a schematic of an interface assembly of the additive manufacturing device of FIG. 1 according to another embodiment.

In the embodiment shown in FIG. 10, the at least one separating layer 260 comprises an upper separating layer 260*a* positioned above the sensor 170 such that the sensor interface 176 contacts a bottom surface of the upper separating layer 260*a*. The upper separating layer 260*a* also forms a top layer of the interface assembly 160, such that a top surface 262*a* of the upper separating layer 260*a* forms the build surface 164 of the interface assembly 160 and is configured to be in direct contact with the feedstock 110. The upper separating layer 260*a* may be constructed or configured to protect the sensor 170 from damage from forces exerted on (or otherwise experienced by) the interface assembly 160 during a plurality of build cycles and over multiple build processes. Additionally, as the top surface 262*a* forms the build surface 164, the upper separating layer 260*a* may also be constructed and configured to reduce adherence between a newly polymerized layer 122 and the build surface 164.

In the embodiment shown in FIG. 11, the at least one separating layer 260 comprises a lower separating layer 260*b* positioned below the sensor 170, such that a top surface 262*b* of the lower separating layer 260*b* contacts the bottom surface 175 of the sensor 170. The lower separating layer 260*b* may protect the sensor 170 from damage due to contact with other components of the interface assembly 160 underneath it and/or with the bottom wall 106 as forces are exerted on (or otherwise experienced by) the interface assembly 160 during a plurality of build cycles and over multiple build processes. The lower separating layer 260*b* may also protect any layers of the interface assembly 160 positioned underneath it (such as the structural layer 270 shown in FIG. 13 or heating films 282*a* and 282*b* shown in FIGS. 14 and 15 for example) from damage due to forces exerted on (or otherwise experienced by) the interface assembly 160.

In some embodiments, the at least one separating layer 260 of a particular interface assembly 160 may include more than one separating layer 260. For example, in some embodiments (not shown), the interface assembly 160 may include both the upper separating layer 260*a* positioned above the sensor 170 and the lower separating layer 260*b* positioned below the sensor 170. Alternatively, in the embodiment shown in FIG. 12, the at least one separating layer 260 comprises a first separating layer 260*c* positioned above the sensor 170 and an adjacent second separating layer 260*d* positioned above the first separating layer 260*c*. The first and second separating layers 260*c* and 260*d* may be coupled at a separating layer interface 264 where a top surface 262*c* of the first separating layer 260*c* contacts a bottom surface of the second separating layer 260*d*. The second separating layer 260*d* also forms a top layer of the interface assembly 160, such that a top surface 262*d* of the second separating layer 260*d* forms the build surface 164 of the interface assembly 160 and is configured to be in direct contact with the feedstock 110.

Using two adjacent separating layers 260*c* and 260*d* may provide additional protection for the sensor 170 from damage by forces exerted on (or otherwise experienced by) the interface assembly 160 during a plurality of build cycles and over multiple build processes. Additionally, using adjacent separating layers 260*c* and 260*d* may facilitate detachment of certain layers of the interface assembly 160 from other layers at the separating layer interface 264 to allow any detached layers to be easily replaced. Referring to the embodiment shown in FIG. 12, the second separating layer 206*d* may be detached from the remaining layers of the interface assembly 160 (including the first separating layer 260*c* and the sensor 170) at the separating layer interface 264 and may be replaced without replacing any of the remaining layers of the interface assembly 160. To facilitate detachment of the first and second separating layers 260*c* and 260*d*, the container 102 may include a bottom portion 266 configured to retain the first separation layer 260*c* and the sensor 170 and a top portion 267 configured to retain the second separating layer 260*d*. The bottom and top portions 266 and 267 may be removably coupled to each other, such as through a detachable mechanical connection or a reusable adhesive for example. Decoupling the top portion 267 from the bottom portion 266 may detach the second separating layer 260*d* from the first separating layer 260*c* at the separating layer interface 264. The detached second separating layer 260*d* may then be replaced with a new second separating layer 260*d*. Re-coupling the top portion 267 to the bottom portion 266 may then attach the new second separating layer 260*d* to the first separating layer 260*c* at the separating layer interface 264.

Alternatively, in some embodiments (not shown), the interface assembly 160 may include both the first and second separating layers 260*c* and 260*d* positioned above the sensor 170, as well as the lower separating layer 260*b* positioned below the sensor 170.

Figure 11:
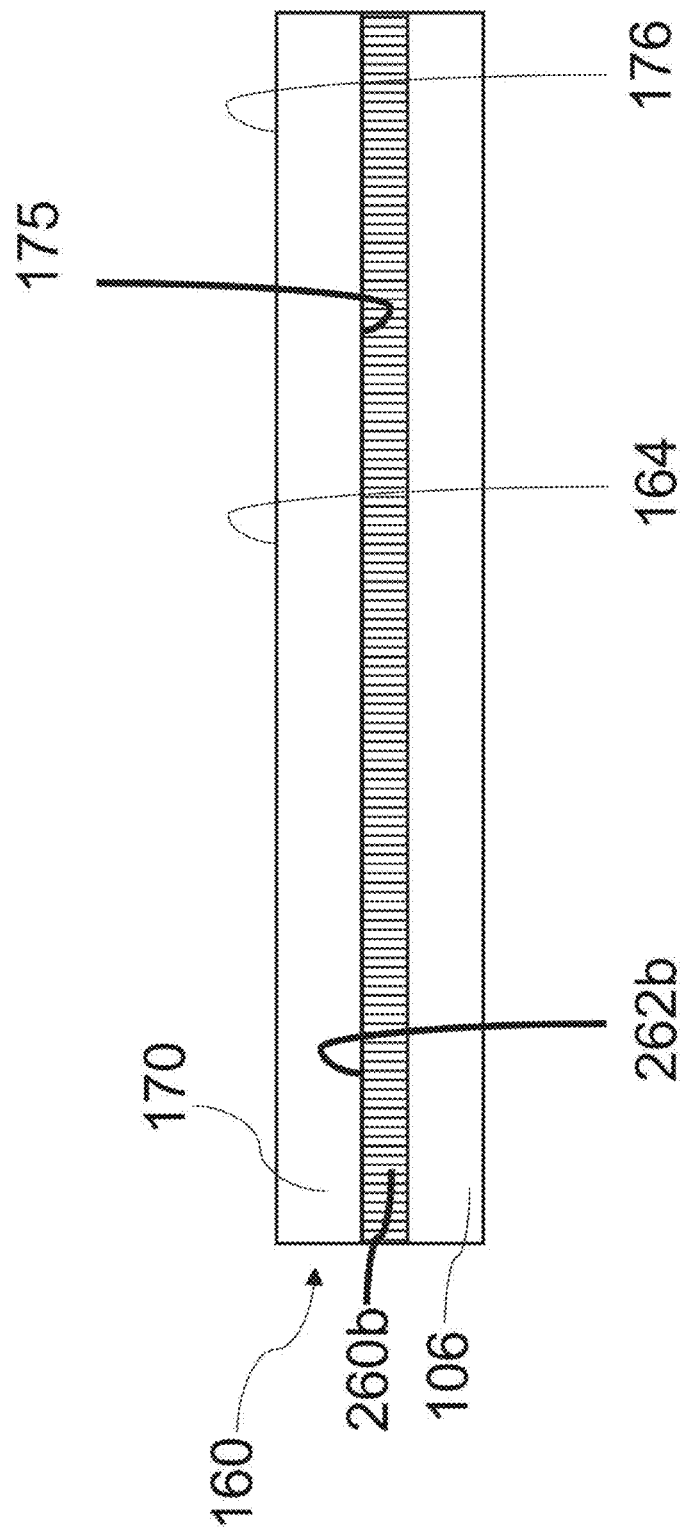
FIG. 11 is a schematic of an interface assembly of the additive manufacturing device of FIG. 1 according to another embodiment.
Figure 12:
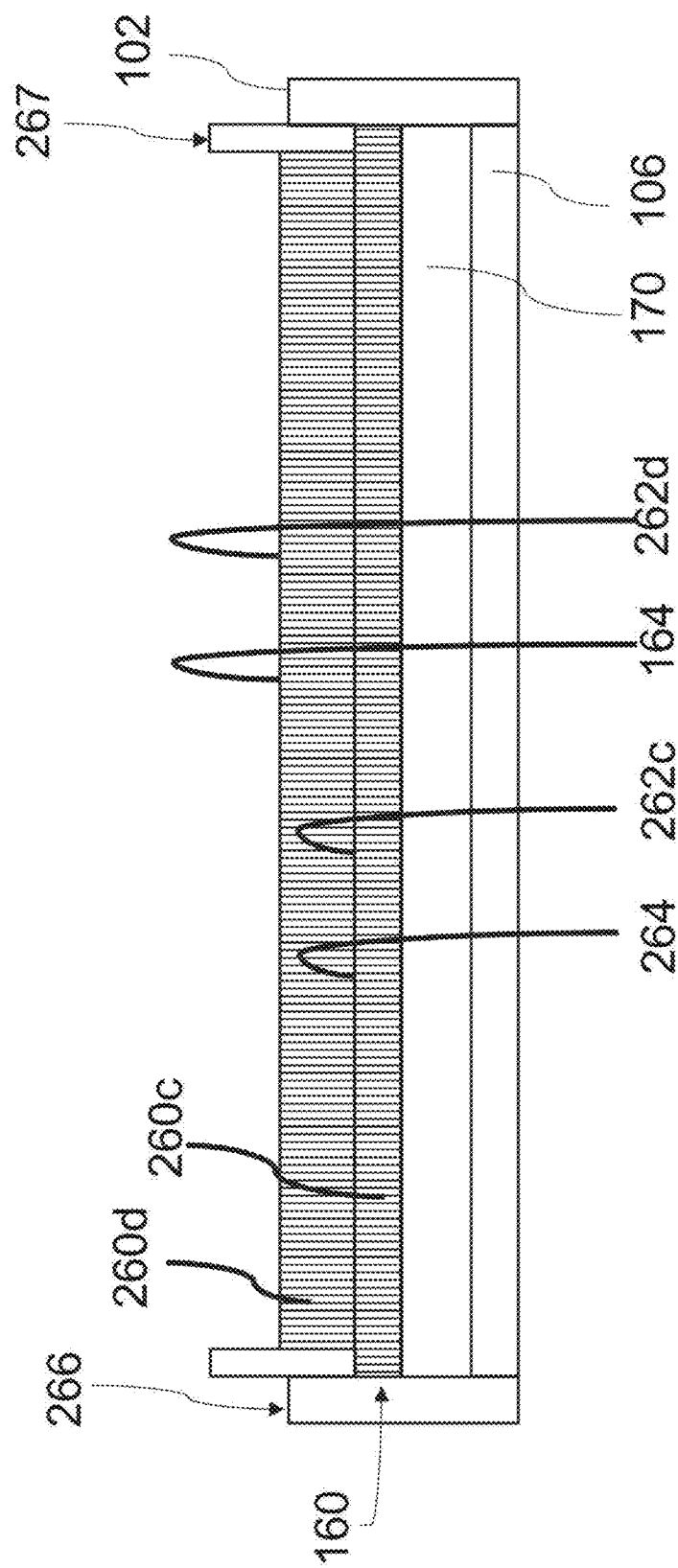
FIG. 12 is a schematic of an interface assembly and a container of the additive manufacturing device of FIG. 1 according to another embodiment.

As the separating layer 260 (such as the upper separating layer 260*a*, the lower separating layer 260*b*, the first separating layer 260*c* and the second separating layer 260*d* shown in FIGS. 10-12 for example) forms a part of the interface assembly 160, the separating layer 260 may also need to satisfy the transparency threshold and the flexibility threshold required for use in the device 100, either individually or collectively with the other layers of the interface assembly 160 (including the sensor 170 for example). Similar to the sensor 170, the separating layer 260 may satisfy the transparency threshold and the flexibility threshold by its construction or configuration.

For the separating layer 260 to protect the sensor 170 (or other layers of the interface assembly 160 positioned underneath it), the separating layer 260 may be constructed of more durable material than the sensor 170 (or the other layers) and may be required to satisfy a higher flexibility threshold than the sensor 170 (or the other layers). Alternatively or additionally, the separating layer 260 may also be constructed or configured to be replaced after a particular number of build cycles after it becomes damaged from use or after it no longer satisfies the transparency and/or the flexibility threshold. Additionally, in embodiments where the separating layer 260 forms the top layer of the interface assembly 160 (such as the upper separating layer 260*a* shown in FIG. 10 and the second separating layer 260*d* shown in FIG. 12), a top surface (such as the top surfaces 262a and 262d) of the separating layer 260 functions as the build surface 164 where the polymerization reaction of the feedstock 110 occurs and directly contacts the feedstock 110. In such embodiments, the separating layer 260 may also be constructed and configured to reduce adherence of a newly polymerized layer 122 to the build surface 164 during the post-exposure stage (such as the post-exposure stages 360a and 360b shown in FIG. 17) of the build cycle.

To provide the above functionalities, the separating layer 260 may be required to satisfy a specific separating layer flexibility threshold. The separating layer flexibility threshold may be different from the flexibility threshold required of the sensor 170 or other layers of the interface assembly 160, such that the separating layer 260 is more flexible and/or more durable than the sensor 170 or the other layers. The separating layer flexibility threshold may include one or more of a separating layer modulus criteria and a separating layer radius of curvature criteria. The separating layer may satisfy the separating layer modulus criteria when it has a flexural modulus of less than 4 GPa and may satisfy the separating layer radius of curvature criteria when it has a radius of curvature equal to or less than 6 mm.

Further, in embodiments where the separating layer 260 is positioned above the sensor 170 (such as the upper separating layer 260a shown in FIG. 10 and the first and second separating layers 260c and 260d shown in FIG. 12), the sensor interface 176 of the sensor 170 may be in contact with a bottom surface of the separating layer 260. In such embodiments, the separating layer 260 may also be constructed or configured such that the temperature of the feedstock 110 at the reaction interface 112 is substantially transferred from the top surface of the separating layer 260 to the bottom surface of the separating layer 260, and in particular such that any change in temperature at the reaction interface 112 is evenly and uniformly transferred from the top surface of the separating layer 260 to the bottom surface of the separating layer 260. This may allow the temperature sensed by the sensor 170 at the bottom surface of the separating layer 260 to be an accurate proxy of the temperature of the feedstock 110 at the reaction interface 112. For example, the separating layer 260 may comprise a highly thermal conductive material, such as one or more of graphene, silver nanowires and aluminum oxynitride. Additionally, the separating layer 260 may have a thickness of less than approximately 5000 μm.

Non-limiting examples of materials which may form the at least one separating layer 260 include PET, poly(ethene-co-tetrafluoroethene) (ETFE), FEP, TPX, Teflon AF2400, Teflon AF1600, fluoropolymers, silicone, silicone hydrogel, and hydrogel. In embodiments of the interface assembly 160 including more than one separating layer 260, the different separating layers may be made of a same material or may be made of different materials. The separating layer 260 may also be of various thicknesses, and the thickness may range between approximately 25 μm and approximately 6000 μm for example. In embodiments including more than one separating layer 260, the different separating layers may have a same thickness or different thicknesses.

The separating layer 260 may also be tensioned. For example, the second separating layer 260d (shown in FIG. 12) may be mechanically tensioned upon installation in the top portion 267 of the container 102. Tension in a particular separating layer 260 may be at least approximately 50 Hz, may range between approximately 50 Hz and approximately 500 Hz, and may preferably be at most approximately 300 Hz. A separating layer 260 under high-tension (i.e. high frequency) may encourage the interface assembly 160 to form a flat configuration of the build surface 164 after forces are exerted on (or otherwise experienced by) the interface assembly 160 during the pre-exposure and post-exposure stages (such as the pre-exposure stages 340a and 340b and the post-exposure stages 360a and 360b shown in FIG. 17) of build cycles, but may be more prone to damage over a plurality of build cycles and may be more difficult to separate from a newly polymerized layer 122. A separating layer 260 under a low tension (i.e. low frequency) or no tension may more slowly reform the flat configuration of the build surface 164, but may be more durable and may more easily separate from a newly polymerized layer 122. In embodiments including more than one separating layer 260, each separating layer may be under a same tension or different tensions. For example, separating layers 260 configured to be positioned above the sensor 170 (the upper separating layer 260a in FIG. 10 and the first and second separating layers 260c and 260d in FIG. 12) may be tensioned higher than those configured to be positioned below the sensor 170 (the lower separating layer 260b shown in FIG. 11).

Some embodiments of the interface assembly 160 may further include at least one structural layer 270. The structural layer 270 may (a) provide structural support to layers of the interface assembly 160 positioned above it, (b) encourage the interface assembly 160 to form the flat configuration of the build surface 164 after forces are exerted on (or otherwise experienced by) the interface assembly 160 during build cycles and (c) maintain the build surface 164 in the flat configuration during the polymerization of the feedstock 110. The build surface 164 having the flat configuration may provide for more accurate polymerization of the feedstock 110 according in a particular shape and a particular configuration based on a received frame (such as the frame in the frame signals 250 shown in FIG. 1), as the radiation emitted by the radiation source 130 is less likely to be distorted as it travels through the interface assembly 160.

Figure 13:
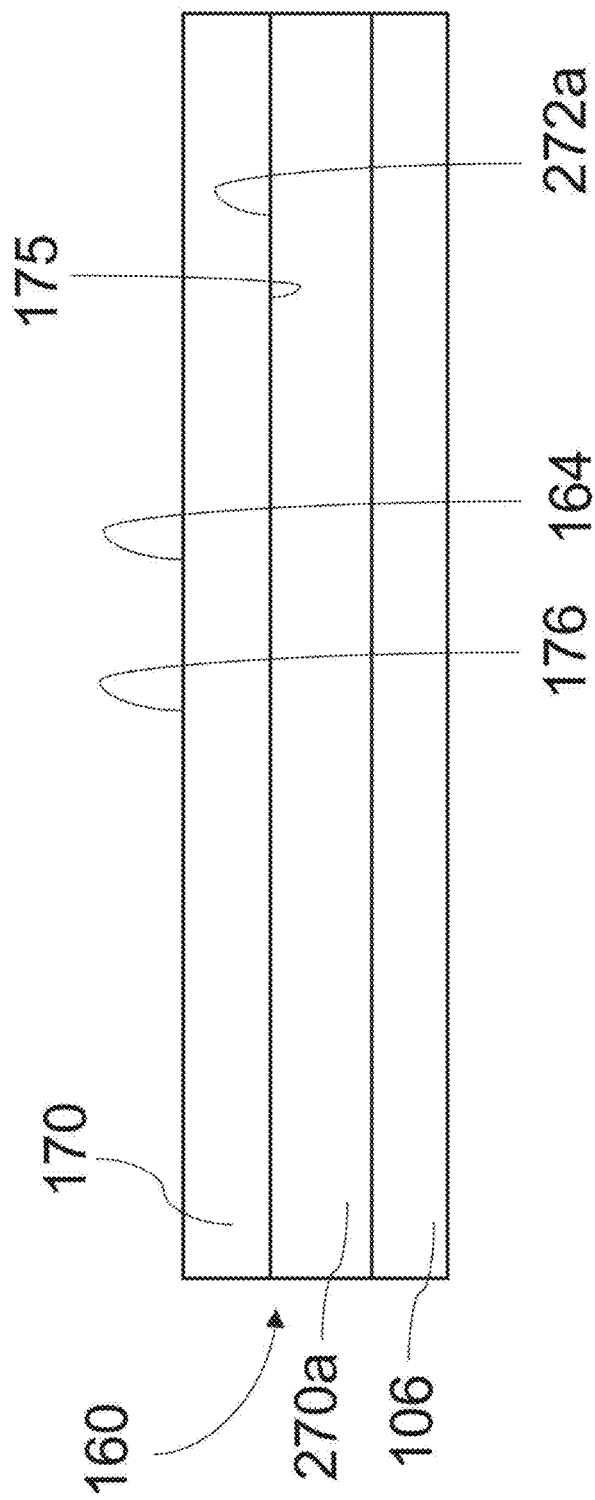
FIG. 13 is a schematic of an interface assembly of the additive manufacturing device of FIG. 1 according to another embodiment.

In the embodiment shown in FIG. 13, the at least one structural layer 270 comprises a lower structural layer 270a positioned as a bottom layer of the interface assembly 160, such that a bottom surface of the structural layer 270a contacts a top surface of the bottom wall 106. In the embodiment shown, a top surface 272a of the lower structural layer 270a contacts the bottom surface 175 of the sensor 170. In other embodiments, the at least one structural layer 270 may include more than one structural layer 270. For example, the interface assembly 160 may include both an upper structural layer (not shown) positioned above the sensor 170 and the lower structural layer 270a positioned below the sensor 170. In yet other embodiments (not shown), the interface assembly 160 may include the at least one structural layer 270, the at least one separating layer 260 and the sensor 170. For example, the interface assembly 160 may include the upper separating layer 260a (shown in FIG. 10) positioned above the sensor 170, the lower separating layer 260b (shown in FIG. 11) positioned below the sensor 170 and the lower structural layer 270a positioned below the lower separating layer 260b such that the top surface 272a contacts the bottom surface of the lower separating layer 260b. As an additional example, other embodiments of the interface assembly 160 may include the first and second separating layers 260c and 260d (shown in FIG. 12) positioned above the sensor 170 and the lower structural layer 270a positioned below the sensor 170 such that the top surface 272a contacts the bottom surface 175 of the sensor 170.

As the structural layer 270 (such as the structural layer 270a shown in FIG. 13) forms a part of the interface assembly 160, the structural layer 270 may also need to satisfy the transparency threshold and the flexibility threshold required for use in the device 100, either individually or collectively with the other layers of the interface assembly 160 (including the sensor 170 and the at least one separating layer 260 for example). Similar to the sensor 170 and the separating layer 260, the structural layer 270 may satisfy the transparency threshold and the flexibility threshold by its construction or configuration.

Additionally, as the structural layer 270 is configured to provide structural support for the layers of the interface assembly 160 positioned above it and to encourage the formation of the flat configuration of the build surface 164, the structural layer 270 may be required to be sufficiently rigid to support the other layers of the interface assembly 160 and the feedstock 110. Additionally, in some embodiments, a top surface (such as the top surface 272a shown in FIG. 13) of the structural layer 270 may have adhering features and may be constructed and configured to adhere to a bottom surface of an adjacent layer of the interface assembly 160. For example, the top surface may have an adhesive or other tacky material thereon. Alternatively, the top surface may have adhering features which interact with corresponding adhering features on the bottom surface of the adjacent layer. For example, in the embodiment shown in FIG. 13, the top surface 272a of the structural layer 270a may have adhesive material and the bottom surface 175 of the sensor 170 may have microstructure texture; the combination of the adhesive material and the surface texture may promote strong adhesion between the top surface 272a and the bottom surface 175. In other embodiments, the top surface of the structural layer 270 may also have a microstructure texture, and may be corona-treated to generate surface prints or other surface texture which may function as the adhering features.

Top surfaces of the structural layers 270 which have the adhering features may be useful in embodiments of the interface assembly 160 where certain layers of the interface assembly 160 are detachable from the remaining layers. For example, in some embodiments of the interface assembly 160 including the first and second separating layers 260c and 260d (shown in FIG. 12) positioned above the sensor 170 and the lower structural layer 270a positioned below the sensor 170, adhering features on at least one of the top surface 272a of the lower structural layer 270a and the bottom surface 175 of the sensor 170 promoting strong adherence between the top surface 272a and the bottom surface 175 may facilitate detachment of the second separating layer 260d at the separating layer interface 264 due to the relative weak adherence between the first and second separating layers 260c and 260d without damage to other layers of the interface assembly 160.

Non-limiting examples of materials which may form the structural layer 270 include mineral oil, silicone, silicone hydrogel, silicone putty, oleo gel and hydrogel. The structural layer 270 may also have a thickness ranging from approximately 1 mm to approximately 30 mm.

Referring briefly back to FIG. 1, some embodiments of the device 100 further include the heating source 280 configured to heat the feedstock 110 to a desired temperature or above a threshold temperature. Heating the feedstock 110 to the target temperature (or above the threshold temperature) may decrease the viscosity of the feedstock 110 to a target viscosity (or to exceed a threshold viscosity). Feedstock 110 at the target temperature (or above the threshold temperature) and/or at the target viscosity (or above the threshold viscosity) may polymerize to a greater extent (i.e. higher degree of polymerization) and easily in response to the radiation emitted by the radiation source 130, due at least in part to increase mobility of the feedstock 110, increased penetration of the radiation into the feedstock 110 and/or decreased critical energy dose of the radiation required for polymerization of the feedstock 110. This can reduce the required exposure intensity and/or the required exposure interval for the radiation to sufficiently polymerize a particular layer 122 of the structure 120, which can in turn reduce the cycle time for a particular build cycle and the overall build time for a particular build process. Layers 122 may be considered "sufficiently" polymerized when the layer 122 maintains the shape and configuration of the received frame (such as the frame in the frame signals 250 shown in FIG. 1) and can withstand forces exerted on the structure 120 over a build process. The feedstock 110 at the target viscosity (or above the threshold viscosity) may also reduce adhesion between a newly polymerized layer 122 and the build surface 164, due at least in part to the increased mobility of the feedstock 110.

The heating source 280 may be configured to generate heat at a plurality of intensities, and may be configured to generate heat between 100 W/m² and 20,000 W/m². The heating source 280 may be responsive to an intensity component of heater signals 256 sent by the controller 310 to generate heat at a particular intensity, and the intensity component may be based at least in part on the temperature at the reaction interface 112 sensed by the sensor 170.

The heating source 280 may also be configured to generate the heat at a particular start time (an "heating start time", such as heating start times 345a and 345b shown in FIG. 17) during a particular build cycle and for a particular duration (a "heating interval", such as heating intervals 346a and 346b shown in FIG. 17). The heating source 280 may be responsive to start time and interval components of the heater signals 256 sent by the controller 310 to generate the heat at a particular start time in a build cycle and for a particular duration, and the start time and interval components may be based at least in part on the temperature at the reaction interface 112 sensed by the sensor 170.

In some embodiments, the heating source 280 may be configured to heat an environment around the feedstock 110 to indirectly heat the feedstock 110. For example, the heating source 280 may comprise heating elements (not shown) positioned within the build chamber 101 but not in direct contact with the feedstock 110. In other embodiments, the heating source 280 may be configured to heat the feedstock 110 directly. For example, the heating source 280 may comprise heating elements (not shown) positioned on or within the sidewalls 104 or the bottom wall 106 of the container 102 and in direct contact with the feedstock 110. Alternatively, referring to FIG. 14, the heating source 280 may comprise a conductive heating film which forms a layer of the interface assembly 160 and is configured to heat the feedstock 110 through the interface assembly 160.

Figure 14:
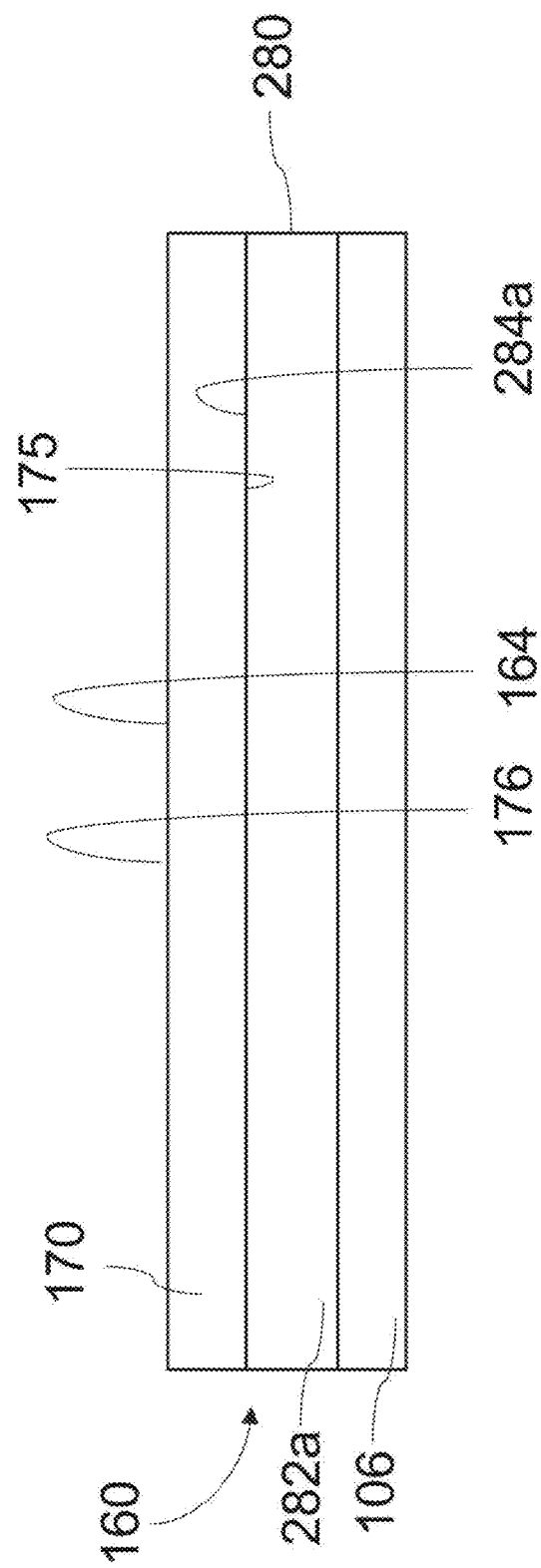
FIG. 14 is a schematic of an interface assembly of the additive manufacturing device of FIG. 1 according to another embodiment.

In the embodiment shown in FIG. 14, the interface assembly 160 includes the heating source 280 comprising a heating film 282a and the sensor 170. The heating film 282a is positioned underneath the sensor 170, such that a top surface 284a of the heating film 282a contacts the bottom surface 175 of the sensor 170. Other embodiments of the interface assembly 160 may include additional layers in combination with the heating film 282a and the sensor 170, such as one or more of the at least one separating layer 260 and the at least one structural layer 270. For example, the interface assembly 160 may include the upper separating layer 260a (shown in FIG. 10) positioned above the sensor 170 as the top layer of the interface assembly 160, and the heating film 282a positioned below the sensor 170. In yet other embodiments, the interface assembly 160 may include the upper separating layer 260a (shown in FIG. 10) positioned above the sensor 170 as the top layer of the interface assembly 160, the heating film 282a positioned below the sensor 170, the lower separating layer 260b (shown in FIG. 11) positioned below the heating film 282a, and the lower structural layer 270a (shown in FIG. 13) positioned below the lower separating layer 260b. As described above, the separating layers 260 may protect layers of the interface assembly 160 positioned underneath it from damage caused by forces exerted on (or otherwise experienced by) the interface assembly 160 during a plurality of build cycles or over multiple build processes, and the structural layer 270 may provide structural support to layers of the interface assembly 160 positioned above it.

In embodiments of the interface assembly 160 including at least one layer positioned above the heating film 282a (such as the sensor 170 or the upper separating layer 260a for example), the at least one layer positioned above the heating film 282a may be constructed or configured such that heat generated by the heating film 282a is transferred through the at least one layer to heat the feedstock 110 at the reaction interface 112. For example, such layers positioned above the heating film 282a may comprise a highly thermal conductive material, and may comprise one or more of graphene, silver nanowires and aluminum oxynitride for example. Such layers positioned above the heating film 282a may also have a thickness of less than 5000 μm.

Additionally, in embodiments where the sensor 170 is positioned proximate the heating film 282a (such as above the heating film 282a shown in FIG. 14 for example), the sensor 170 may be constructed or configured such that the heat generated by the heating film 282a is transferred therethrough without damage to the material properties of the sensor 170 (such as the temperature sensitivity properties and the optical transmittance properties for example). In such embodiments, the sensor 170 may also be required to satisfy a temperature threshold. The temperature threshold may include at least a temperature-based durability criteria. The sensor 170 may satisfy the temperature-based durability criteria if it maintains the material properties of the sensor 170 within a reasonable deviation after repeated heat exposure cycles over a plurality of build cycles. For example, the sensor 170 may satisfy the temperature-based durability criteria if it maintains ±20% variation for at least one material property after at least 10,000 heat exposure cycles to temperatures ranging from 20° C. to 120° C. In other embodiments, the sensor 170 may satisfy the temperature-based durability criteria if it maintains ±30% variation for at least one material property, ±10% variation for at least one material property, or ±5% variation for at least one material property after at least 10,000 heat exposure cycles to temperatures ranging from 20° C. to 120° C.

As the heating film 282a forms a part of the interface assembly 160, the heating film 282a may also need to satisfy the transparency threshold and the flexibility threshold required for use in the device 100, either individually or collectively with the other layers of the interface assembly 160. The heating film 282a may satisfy the transparency threshold and the flexibility threshold by its construction or its configuration. In this respect, the heating film 282a may be similar to the conductive film 180 of the sensor 170a (shown in FIGS. 3 and 4A-4I) and may comprise conductive material and a carrier.

Non-limiting examples of the conductive material of the heating film 282a include one or more of PEDOT:PSS, carbon, graphene, metal (such as silver, gold and copper for example) and metal alloy (such as cupronickel and silver alloy for example). The conductive materials the heating film 282a may also be dimensioned as microstructures or nanostructures, including without limitation the 0D nanostructures, the 1D nanostructures, or the 2D nanostructures.

Non-limiting examples of material which may form the carrier of the heating film 282a comprise silicone, glass, PET, PC, polyimide, FEP, PTFE, PEN, polyacrylate, acrylic, polyester, triacetate, PE and PP.

In some embodiments, the heating film 282a may be existing conductive films. Examples include:
Kodak HCF film/ESTAR base coated with PEDOT:PSS;
Honeywell flexible heater 78000 series;
TDK Ag-stacked film;
Minco Thermal-Clear™ transparent heater;
Canatu Carbon nanobud CNB™ film heaters;
Dontech Therma Klear™ series transparent heaters;
Chasm transparent film AgeNT-10, AgeNT-30, AgeNT-75; VC102
Chasm AgeNT-1 hybrid transparent conductive film;
3M Electrically conductive thermosetting film 2201P; and
Microcontinuum™ nanoMesh transparent conductive film.

In some embodiments, the device 100 may include a plurality of the heating sources 280. For example, some embodiments may include the heating film 282a (shown in FIG. 14) in combination with one or more of heating elements positioned within the build chamber 101 (not shown) or heating elements positioned on or within the sidewalls 104 or the bottom wall 106 of the container 102 (not shown). Additionally, some embodiments may include a plurality of heating sources each configured and positioned to heat a portion of the feedstock 110 over only a particular region 109 of the build area 108. For example, referring to FIG. 15, the heating source 280 is a heating film 282b comprising a plurality of sub-heating films 290a-290e each configured and positioned to heat portions of the feedstock 110 over a respective one of a plurality of regions 109a-109e of the build area 108 independently of the other sub-heating films 290a-290e. Other embodiments may include more or fewer sub-heating films, and may include at least two, at least three, at least four, at least 10, at least 25, at least 50 and at least 100 sub-heating films for example.

Each sub-heating film 290a-290e has a length and a width defining a respective sub-heating film area. In the embodiment shown, the sub-heating film area correspond to the area of the associated region 109a-109e that the sub-heating film 290a-290e is configured to heat. However, in other embodiments, the sub-heating film area may be smaller than the area of the associated region 109a-109e. Additionally, in the embodiment shown, the respective sub-heating film areas of each sub-heating film 290a-290e have a substantially identical shape and substantially similar dimensions, and are each a rectangle having a width of approximately 1 cm and a length of approximately 20 cm. However, in other embodiments (not shown), different sub-heating films may have different shapes and different dimensions from each other, and may have shapes and dimensions different from that described above.

Each sub-heating films 290a-290e may be responsive to, and independently controlled by, a respective heater signal 256 (shown in FIG. 1) sent by the controller 310. Using the sub-heating films 290a-290e can thus improve the granularity of temperature control across the build area 108 and can enable variable heating of the feedstock 110 over different regions 109a-109e. In this respect, similar to the heating film 282a, each sub-heating film 290a-290e may be controlled by (a) the intensity component of the respective heater signal 256 to generate heat at a particular intensity, (b) the start time component of the respective heater signal 256 to generate heat at a particular start time in a build cycle, and (c) the interval component of the respective heater signal 256 to generate heat for a particular duration.

Figure 15:
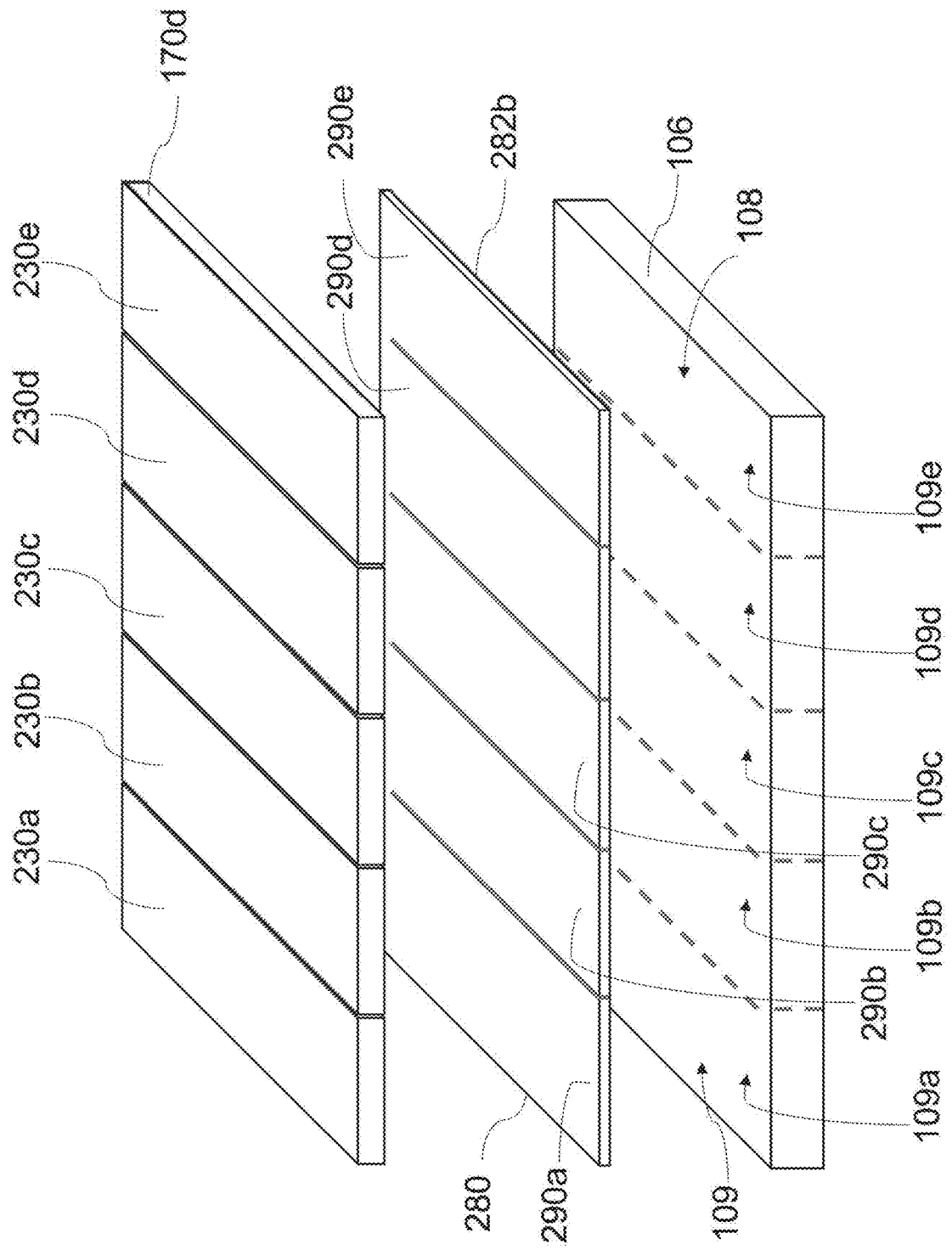
FIG. 15 is a perspective view of an interface assembly of the additive manufacturing device of FIG. 1 according to another embodiment.
Figure 16:
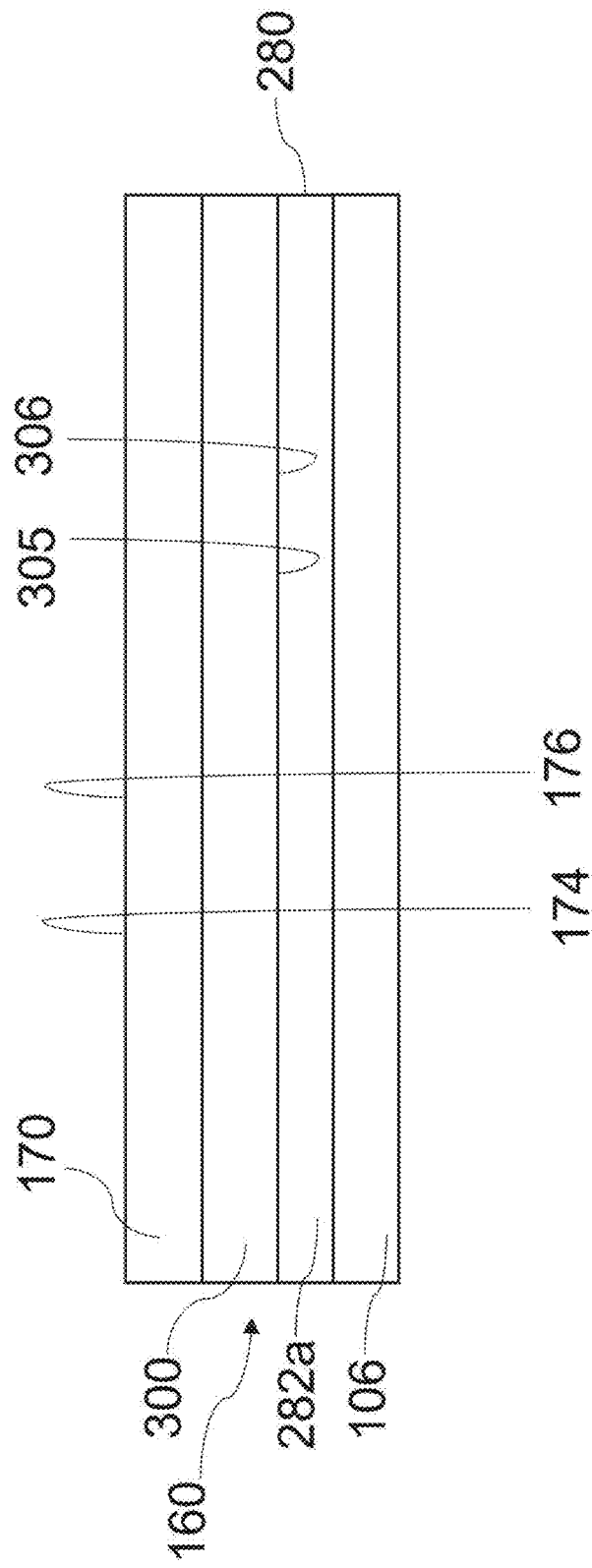
FIG. 16 is a schematic of an interface assembly of the additive manufacturing device of FIG. 1 according to another embodiment.

Further, in the embodiment shown in FIG. 15, each region 109a-109e is also associated with a corresponding one of the sub-sensors 230a-230e of the sensor 170d (also shown in FIG. 8). The intensity, start time and interval components of the heater signals 256 for a particular sub-heating film 290a-290e associated with a particular region 109a-109e may be based at least in part on the temperature at the reaction interface 112 sensed by the corresponding sub-sensor 230a-230e associated with the same region 109a-109e. In the embodiment shown, each region 109a-109e is associated with a respective sub-sensor 230a-230e and a respective sub-heating film 290a-290e, such that the number of sub-heating films 290a-290e for heating the feedstock 110 over a particular build area 108 corresponds to the number of sub-sensors 230a-230e for sensing the temperature at the reaction interface 112 over that particular build area 108. However, in other embodiments, there may be more sub-heating films than sub-sensors and vice versa.

In some embodiments, the heating source 280 may include an associated heater sensor configured to sense a temperature of the heating source 280 as a proxy for the amount of heat generated by the heating source 280. For example, in the embodiment shown in FIG. 16, the interface assembly 160 includes the heating source 280 comprising the heating film 282a, the sensor 170, and a heater sensor 300. A bottom surface 305 of the heater sensor 300 contacts a top surface of the heating film 282a.

The heater sensor 300 may be constructed or configured in a manner similar to the sensor 170, and may comprise the conductive film 180 (shown in FIGS. 3 and 4A-4I) or the conductive hydrogel 210 (shown in FIGS. 5 and 6A-6B). However, in the embodiment shown in FIG. 16, the heater sensor 300 is configured to sense a temperature of material in contact with the bottom surface 305 (rather than with a top surface) of the heater sensor 300, and the bottom surface 305 thus forms a sensor interface 306 of the heater sensor 300. As the sensor interface 306 is in contact with a top surface of the heating film 282a, the sensor interface 306 senses the temperature of the heating film 282a. The heater sensor 300 may send the temperature sensed at the sensor interface 306 to the controller 310 as the temperature data signals 255 (shown in FIG. 1).

Referring back to FIG. 1, the controller 310 comprises at least one processor and an input/output interface and is configured to communicate with different components of the device 100 to receive information signals from the components and to send control signals to control the components to execute the different stages (such as the pre-exposure stages 340a and 340b, the exposure stages 350a and 350b, and the post-exposure stages 360a and 360b shown in FIG. 17) of a build cycle.

As generally described above, in the embodiment shown, the controller 310 receives and sends signals to at least the actuator 150, the sensor 170, the radiation source 130 and the heating source 280. The controller 310 may also communicate with fewer or additional components of the device 100 in embodiments including such additional components. For example, in embodiments where the device 100 does not include the heating source 280 (shown in FIGS. 14-16), the controller 310 may not receive any signals from or send any signals to the heating source 280. Alternatively, in embodiments where the device 100 includes the heater sensor 300 (shown in FIG. 16), the controller 310 may also receive signals from and send signals to the heater sensor 300.

As described above, in the embodiment shown in FIG. 1, the controller 310 may send the frame signals 250 and the emission signals 251 to the radiation source 130. The frame signals 250 may represent frames of full or partial cross-sections of a 3D model of the structure 120, and may represent a shape and configuration of the layer 122 to be formed during a particular build cycle. The frame signals 250 may selectively control the radiation source 130 to emit radiation in a pattern that corresponds to the frame received via the frame signals 250. For example, in embodiments where the radiation source 130 comprises the laser and the galvanometer, the frame signals 250 may control the galvanometer to direct (scan) the radiation emitted by the laser according to the received frame. In embodiments where the radiation source 130 comprises the lamp and the projector, the frame signals 250 may control the projector to direct or mask portions of the radiation emitted by the lamp according to the received frame.

The emission signals 251 control the emission of the radiation by the radiation source 130. The emission signals 251 may include the intensity, interval and start time components. The emission signals 251 may also include the wavelength component in some embodiments and may include additional or fewer components in other embodiments. The intensity component may control the intensity of the radiation emitted by the radiation source 130. The interval component may control a duration of the exposure interval (such as the exposure intervals 352a and 352b shown in FIG. 17) and the start time component may control the exposure start time (such as the exposure start times 351a and 351b shown in FIG. 17) of the radiation emitted by the radiation source 130 during a particular build cycle.

The intensity, interval and start time components may be varied by the controller 310 based at least in part on the temperature at the reaction interface 112 sensed by the sensor 170. For example, where the sensed temperature is high, the radiation source 130 may be controlled by the intensity component to emit the radiation at a lower intensity, by the duration component to emit the radiation for a shorter interval and/or by the start time component to emit the radiation at a later start time in a particular build cycle, as feedstock 110 at a higher temperature has more mobility and may be sufficiently polymerized with radiation at a lower intensity and/or emitted at a shorter exposure interval. Lower intensity radiation, shorter exposure intervals and later exposure start times may also reduce the amount of heat generated from the polymerization of the feedstock 110, which can reduce the likelihood that the feedstock 110 will overheat during a particular build cycle and reduce formation of localized high-temperature regions in the build area 108. Where the sensed temperature is low, the radiation source 130 may be controlled by the intensity component to emit the radiation at a higher intensity, by the interval component to emit the radiation for a longer interval, and/or by the start time component to emit to the radiation at an earlier start time in a particular build cycle to ensure that the feedstock 110 within a particular layer 122 is sufficiently polymerized during a particular build cycle.

In embodiments including a plurality of sub-sensors (such as the sub-sensors 230a-230e shown in FIG. 8 and the sub-sensors 240a-240i shown in FIG. 9) associated with respective regions 109 of the build area 108, the intensity, interval and start time components of the emission signals 251 may be varied by the controller 310 based at least in part on the temperature at the reaction interface 112 over a particular region 109 sensed by the sub-sensor associated with that particular region 109. For example, the controller 310 may control the radiation source 130 to emit radiation incident on a region 109 identified by the associated sub-sensor as a low-temperature region at a higher intensity, for a longer interval or at an earlier start time, to allow the feedstock 110 within the low-temperature region to sufficiently polymerize. Alternatively, the controller 310 may also control the radiation source 130 to emit the radiation incident on a region 109 identified by the associated sub-sensor as a high-temperature region (a) at a lower intensity or for a shorter interval, which may reduce the cycle time and the overall build time, or (b) at a later start time in a particular build cycle, which may allow the identified high-temperature region to cool prior to the exposure interval.

The wavelength component may control the emissive spectrum of the radiation emitted by the radiation source 130. The wavelength component may be varied based at least in part on the type of feedstock 110.

As described above, in the embodiment shown in FIG. 1, the controller 310 may also send the actuator signals 252 to the actuator 150. The actuator signals 252 may include the direction, start time, speed and travel distance components. Other embodiments of the actuator signals 252 may include additional or fewer components.

The direction component may control the actuator 150 to move the build platform 140 in the upward direction 152 or in the downward direction 154. The direction component may be varied based at least in part on a stage of the build cycle. For example, in the pre-exposure stage (such as the pre-exposure stages 340a and 340b shown in FIG. 17), the direction component may control the actuator 150 to move the build platform 140 in the downward direction 154 towards the interface assembly 160. In the post-exposure stage (such as the post-exposure stages 360a and 360b shown in FIG. 17), the direction component may instead control the actuator 150 to move the build platform 140 in the upward direction 152.

The start time component may control the movement start time (such as the pre-exposure movement start times 341a and 341b and the post-exposure movement start times 361a and 361b shown in FIG. 17) of the actuator 150. The speed component may control a speed that the actuator 150 moves the build platform 140 during a particular movement interval (such as the pre-exposure movement intervals 342a and 342b and the post-exposure movement intervals 362a and 362b shown FIG. 17) and the travel distance component may control a distance the actuator 150 moves the build platform 140 along the travel path 156 during a particular movement interval (and in particular during the post-exposure movement intervals 362a and 362b shown in FIG. 17). The speed and travel distance components may be varied based at least in part on the temperature at the reaction interface 112 sensed by the sensor 170. For example, where the sensed temperature is high, the speed and travel distance components may control the actuator 150 to move the build platform 140 at a slower speed and/or a greater distance during the movement intervals to allow the feedstock 110 time to cool to a target temperature (or to below a high temperature threshold) between exposure intervals (such as between the exposure interval 352a and the exposure interval 352b shown in FIG. 17) by the radiation source 130. Where the sensed temperature is low, the speed and travel distance components may instead control the actuator 150 to move the build platform 140 at a faster speed and/or a shorter distance to ensure that the feedstock 110 does not cool to an undesirable temperature (or to below a low temperature threshold) between exposure intervals.

In some embodiments, the actuator signals 252 may also include a position component. The position component may control the actuator 150 to move the bottom layer surface 126 of the portion of the structure 120 adhered to the build platform 140 (or the bottom surface 142 of the build platform 140 during a first build cycle) to the layer distance 144 above the build surface 164 (best seen in FIG. 18A). The layer distance 144 may correspond to a thickness 124 of the layer 122 being formed during a particular build cycle, and the position component may thus in part control the thickness 124 of the layer 122 (best seen in FIG. 18B). The position component may be varied based on the temperature at the reaction interface 112 sensed by the sensor 170. For example, where the sensed temperature is high, the position component may control the actuator 150 to move the build platform 140 to increase the layer distance 144, as the penetration depth of the radiation into the feedstock 110 may have increased and/or the critical energy dose of the radiation required for sufficient polymerization of feedstock 110 may have decreased due to increased mobility of the feedstock 110 at high temperatures. Increasing the thickness 124 for a particular layer 122 based on the temperature at the reaction interface 112 can decrease the overall build time. Where the sensed temperature is low, the position component may control the actuator 150 to move the build platform 140 to decrease the layer distance 144 to ensure that the feedstock 110 at the reaction interface 112 is sufficiently polymerized during a particular build cycle.

As described above, in the embodiment shown in FIG. 1, the controller 310 may also send the sensor signals 254 to the sensor 170. The sensor signals 254 may control operation of the sensor 170 to start and stop sensing a temperature of the material in contact with the sensor interface 176. In the embodiment shown in FIG. 17, the sensor signals 254 controls the sensor 170 to sense the temperature at the sensor interface 176 continuously. However, in other embodiments, the sensor signals 254 may control the sensor 170 to sense the temperature intermittently, and may include the interval and the start time components. The interval component may control a duration of the sensing interval, and the start time component may control the sensing start time in a particular build cycle. The interval and start time components may be controlled to correlate the sensing intervals to the exposure intervals of the radiation source 130. For example, referring to FIG. 17, a sensing interval may coincide with exposure intervals (such as the exposure intervals 352a and 352b) of the radiation emitted by the radiation source 130. The sensing intervals may also be longer than the exposure intervals. For example, referring to FIG. 17, the sensor 170 may be controlled by the duration and the start time components to begin sensing the temperature at least 1 second before the exposure start time (such as before the exposure start times 351a and 351b) and at least 1 second after the exposure stop time (such as after the exposure stop times 353a and 353b). This enables the sensor 170 to sense temperature change at the sensor interface 176 for a small interval before the exposure interval (during the pre-exposure stage for example), during the exposure interval (during the exposure stage for example), and for a small interval after the exposure interval (during the post-exposure stage for example) of the build cycle, which can allow the sensor 170 to sense a change in temperature as a result of the polymerization of the feedstock 110 by the radiation emitted by the radiation source 130.

As described above, in the embodiment shown in FIG. 1, the sensor 170 may also send the temperature data signals 255 to the controller 310. The temperature data signals 255 may represents the temperature sensed by the sensor 170 at the sensor interface 176 during a build cycle and over a build process. In embodiments where the temperature is sensed continuously, the sensor 170 may send the temperature data signals 255 during the entire build process. In embodiments where the temperature is sensed intermittently, the sensor 170 may only send the temperature data signals 255 during the sensing intervals. In the embodiments of the sensor 170 where the sensor interface 176 is in direct contact with the reaction interface 112 or where layers of the interface assembly 160 positioned above the sensor interface 176 are configured to transfer the temperature of the feedstock 110 at the reaction interface 112 therethrough, the temperature data signals 255 may represent a temperature of the feedstock 110 at the reaction interface 112. The controller 310 may control other components of the device 100 using the temperature data signals 255 received from the sensor 170 as described above and below.

In the embodiment of the sensor 170 including a plurality of sub-sensors (such as the sensor 170d comprising the plurality of sub-sensors 230a-230e shown in FIG. 8 and the sensor 170e comprising the plurality of sub-sensors 240a-240i shown in FIG. 9) which independently measure the temperature of the feedstock 110 at the reaction interface 112 over a plurality of different regions 109 of the build area 108, each sub-sensor may send respective temperature data signals 255 to the controller 310. In such embodiments, the controller 310 may use the respective temperature data signals 255 received from each sub-sensor to control other components of the device 100 in response to a specific temperature of a specific region 109 as described above and below.

In embodiments of the device 100 including the heating source 280, the controller 310 may send the heater signals 256 to the heating source 280. The heater signals 256 may include the intensity, the interval and the start time components. In other embodiments, the heater signals 256 may include additional or fewer components.

The intensity component may control the intensity of the heat generated by the heating source 280. The interval component may control a duration of the heating interval (such as the heating intervals 346a and 346b shown in FIG. 17), and the start time component may control the heating start time (such as the heating start times 345a and 345b shown in FIG. 17) during a particular build cycle. The intensity, interval and start time components of the heater signals 256 may be varied based at least in part on the temperature at the reaction interface 112 sensed by the sensor 170. In embodiments of the device 100 including the heater sensor 300, the intensity, interval and start time components may also be varied based at least in part on the temperature of the heating source 280 itself sensed by the heater sensor 300. For example, where the sensed temperature is high, the heating source 280 may be controlled by the intensity component to generate the heat at a lower intensity, by the interval component to generate the heat for a shorter interval and/or by the start time component to generate the heat at a later start time in a particular build cycle or to not generate any heat during a particular build cycle. Where the sensed temperature is low, the heating source 280 may be controlled by the intensity component to generate the heat at a higher intensity, by the interval component to generate the heat for a longer interval, and/or by the start time component to generate the heat at an earlier start time in a particular build cycle to ensure that the feedstock 110 reaches the target temperature (or exceeds the threshold temperature).

Additionally, in the embodiment of the heating source 280 including a plurality of sub-heating films (such as the heating film 282b including sub-heating films 290a-290e shown in FIG. 15) which may be independently controlled to generate heat for a plurality of different regions 109 of the build area 108, the controller 310 may send respective heater signals 256 to each sub-heating film to independently control generation of heat by each sub-heating film. The intensity, interval and start time components of each respective heater signal 256 may be different and may be varied based at least in part on the temperature sensed at the reaction interface 112 of the associated region 109 (as sensed by the associated sub-sensor 230a-230b shown in FIG. 15 for example). For example, the controller 310 may control only the sub-heating film associated with a region 109 identified as a high-temperature region to decrease the intensity of the generated heat, to decrease the heating interval, to implement a later start time for heat generation, or to not generate any heat for a particular build cycle. The heater signals 256 controlling the sub-heating films associated with other regions may be controlled differently. Correspondingly, the controller 310 may control only the sub-heating film associated with a region 109 identified as a low-temperature region to increase the intensity of the generated heat, to increase the heating interval, or to implement an earlier start time for heat generation. The heater signals 256 controlling the sub-heating films associated with other regions may be controlled differently.

Referring now to FIGS. 17 and 18A-18D, the build process 320 for building the structure 120 will be described in greater detail. As described above, the build process 320 includes a plurality of build cycles, including build cycles 322a and 322b. Each build cycle forms a layer 122 of the structure 120. The temperature sensed by the sensor 170 at the sensor interface 176 (which represent a temperature of the feedstock 110 at the reaction interface 112 in certain embodiments as described above) over the build cycle 322a for polymerizing a layer 122 and over the subsequent build cycle 322b for polymerizing a subsequent layer 122 is generally shown at FIG. 17. Each build cycle 322a and 322b includes the pre-exposure stage (the pre-exposure stages 340a and 340b), the exposure stage (the exposure stages 350a and 350b) and the post-exposure stage (the post-exposure stages 360a and 360b). The build process 320 may include additional build cycles which are not depicted in FIG. 17.

The pre-exposure stage (such as the pre-exposure stages 340a and 340b) includes two intervals: (a) the pre-exposure movement interval (such as the pre-exposure movement intervals 342a and 342b) and (b) a pre-exposure delay interval (such as pre-exposure delay intervals 344a and 344b).

Figure 18A:
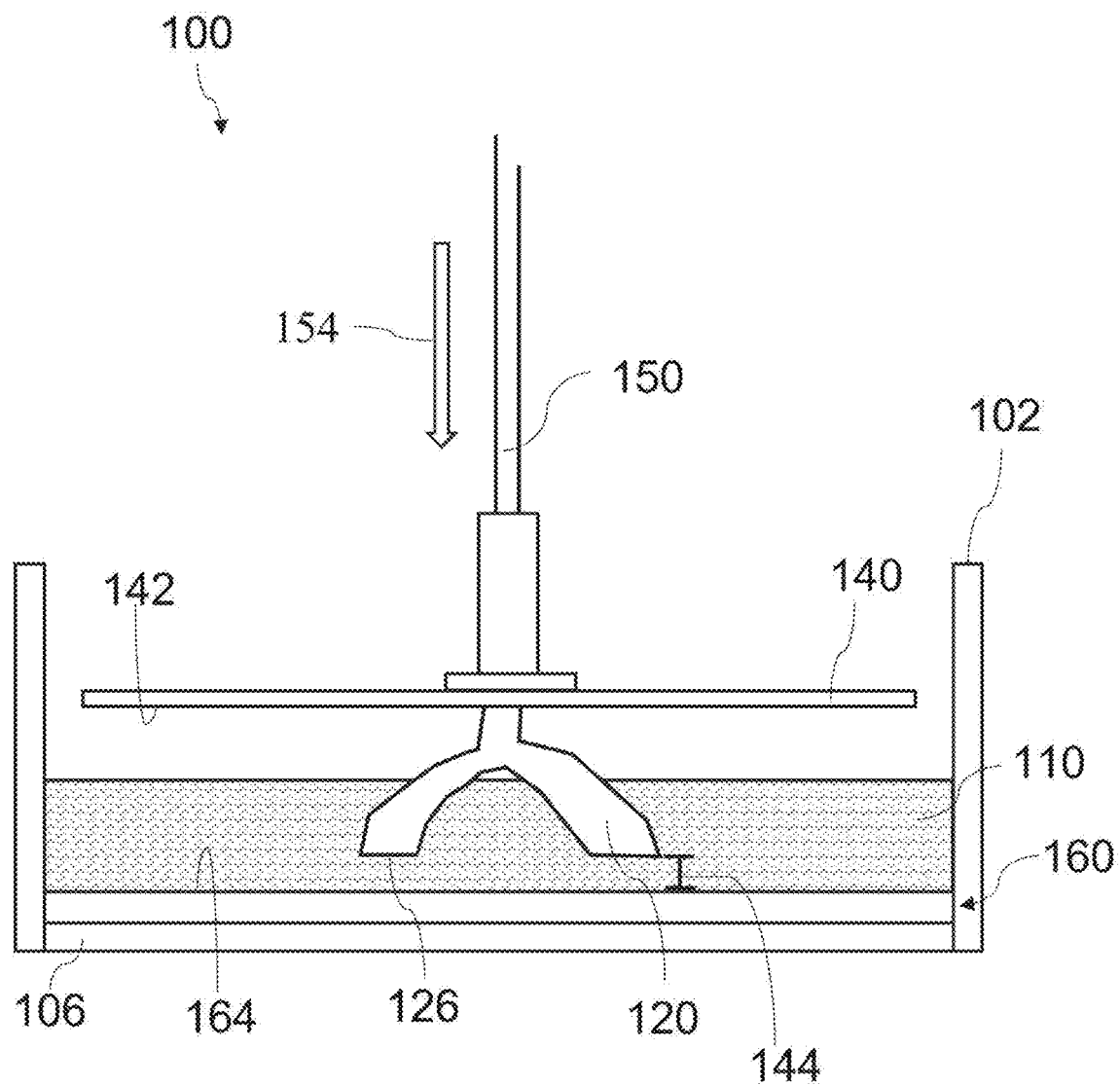
FIGS. 18A-18D are schematics of the additive manufacturing device of FIG. 1 during different stages of a build cycle according to one embodiment.

Referring now to FIGS. 17 and 18A, the pre-exposure movement interval may begin at the pre-exposure movement start time (such as the movement start times 341a and 341b) and continue until a pre-exposure movement stop time (such as movement stop times 343a and 343b). During the pre-exposure movement interval, the actuator 150 may be controlled (such as by the actuator signals 252 from the controller 310 shown in FIG. 1) to move the build platform 140 in the downward direction 154 into the feedstock 110 and towards the interface assembly 160 until the bottom layer surface 126 is the layer distance 144 above the build surface 164. The speed and distance that the actuator 150 moves the build platform 140 during the pre-exposure movement interval may be controlled by the speed and travel distance components of the actuator signals 252. The layer distance 144 may be controlled by one or more of the travel distance and the position components of the actuator signals 252.

Still referring to FIGS. 17 and 18A, the pre-exposure delay interval may begin at the pre-exposure movement stop time (such as the movement stop times 343a and 343b) and continue until the radiation source 130 emits radiation at the exposure start time (such as the exposure start times 351a and 351b). During the pre-exposure delay interval, the actuator 150 may hold build platform 140 stationary such that the bottom layer surface 126 remains the layer distance 144 above the build surface 164. In some embodiments, the exposure start time may be triggered based at least in part on the sensor 170 detecting that the feedstock 110 at the reaction interface 112 has reached a target temperature (or has exceeded a threshold temperature), and in such embodiments, the length of the pre-exposure delay interval may be based at least in part on the real-time temperature of the feedstock 110. In other embodiments, the exposure start time may be a set amount of time after the pre-exposure movement stop time, and the length of the pre-exposure delay interval may be pre-set prior to the start of the build cycle.

In some embodiments (not shown), the actuator 150 may move the build platform 140 until the bottom layer surface 126 contacts the build surface 164. The contact of the bottom layer surface 126 with the build surface 164 may exert a compressive force in the downward direction 154 on the interface assembly 160. After the contact with the build surface 164, the actuator 150 may move the build platform 140 slowly away until the bottom layer surface 126 is the layer distance 144 above the build surface 164. Alternatively, in embodiments where both the interface assembly 160 and the bottom wall 106 are flexible, after contact of the bottom layer surface 126 with the build surface 164, the tensioning system (not shown) underneath the bottom wall 106 may smooth any deformation of the interface assembly 160 and to force the feedstock 110 from between the bottom layer surface 126 and the build surface 164 to achieve a thin even layer of the feedstock 110 for polymerization.

In embodiments of the device 100 including the heating source 280, the heating source 280 may be controlled (such as by the heater signals 256 from the controller 310 shown in FIG. 1) during the pre-exposure stage to apply heat to the feedstock 110 for a particular heating interval (such as the heating intervals 346a and 346b) beginning at a heating start time (such as the heating start times 345a and 345b) and ending at a heating stop time (such as heating stop times 347a and 347b). The intensity of the heat generated during the heating interval and the length of the heating interval may be controlled by the intensity and interval components of the heater signals 256. In some embodiments, the heating start time may be triggered by the sensor 170 detecting that the feedstock 110 has fallen below a particular temperature, and the heating stop time may be triggered by the sensor 170 detecting that the feedstock 110 has reached the target temperature (or has exceeded the threshold temperature), and in such embodiments, the length of the heating interval may be based at least in part on the real-time temperature of the feedstock 110. In other embodiments, the heating start and stop times may be preset prior to the start of the build cycle.

Figure 18B:
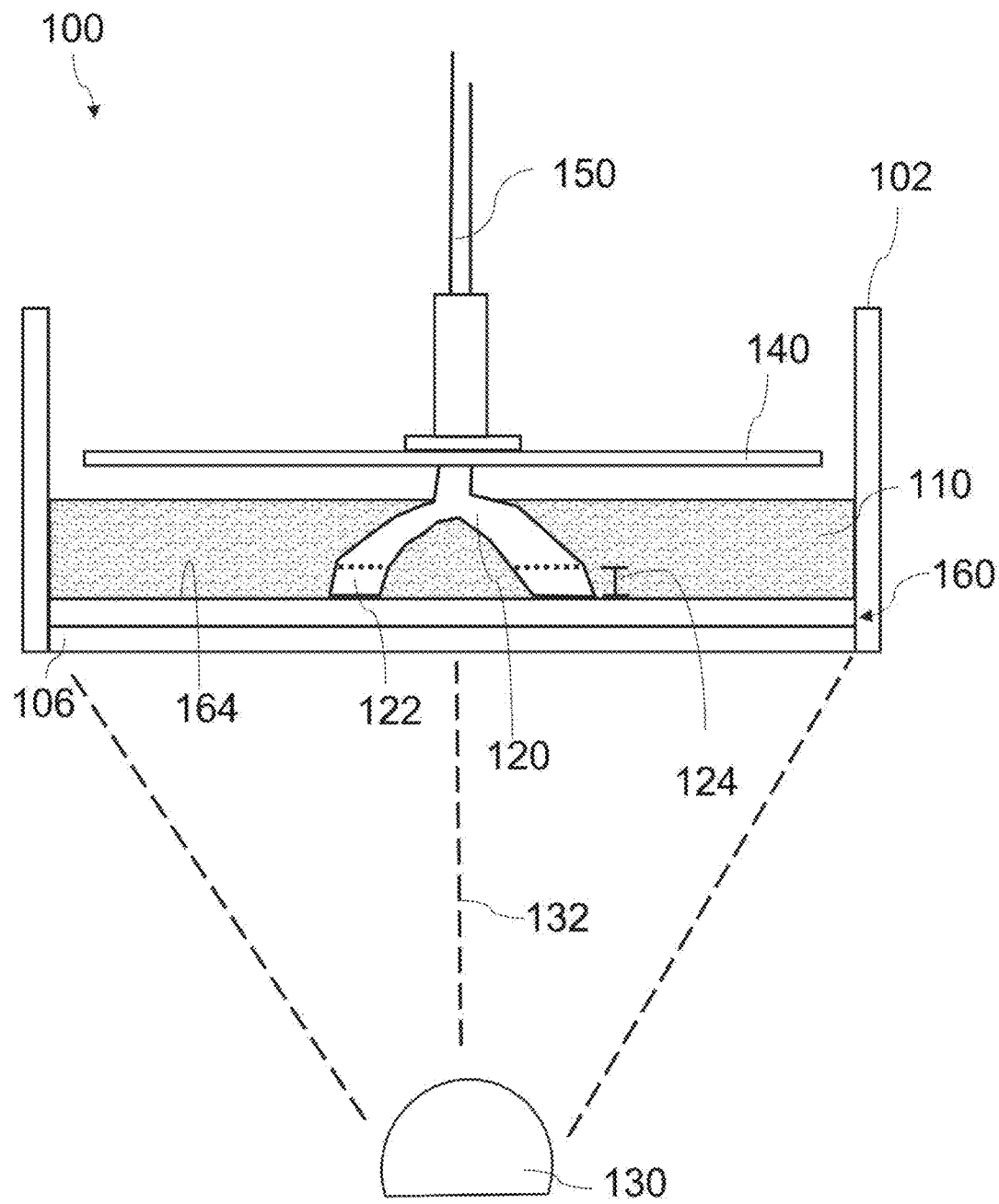

Referring now to FIGS. 17 and 18B, the exposure stage (such as the exposure stages 350a and 350b) of the build cycle may generally correspond to the exposure interval (such as the exposure intervals 352a and 352b) of the radiation emitted by the radiation source 130. In this respect, the exposure interval may begin at the exposure start time (such as the exposure start times 351a and 351b) and may continue until the exposure stop time (such as the exposure stop times 353a and 353b). During the exposure interval, the radiation source 130 may be controlled (such as by the frame and emission signals 250 and 251 from the controller 310 shown in FIG. 1) to emit radiation along the optical path 132 to polymerize a new layer 122 of the structure 120. The new layer 122 has the thickness 124 generally corresponding to the layer distance 144 (shown in FIG. 18A) between the bottom layer surface 126 and the build surface 164 at the pre-exposure stage. The shape and configuration of the new layer 122 may correspond to the frame received in the frame signals 250. An intensity of the radiation emitted during the exposure interval, as well as the length of the exposure interval may be controlled by, respectively, the intensity and duration components of the emission signals 251.

Figure 18C:
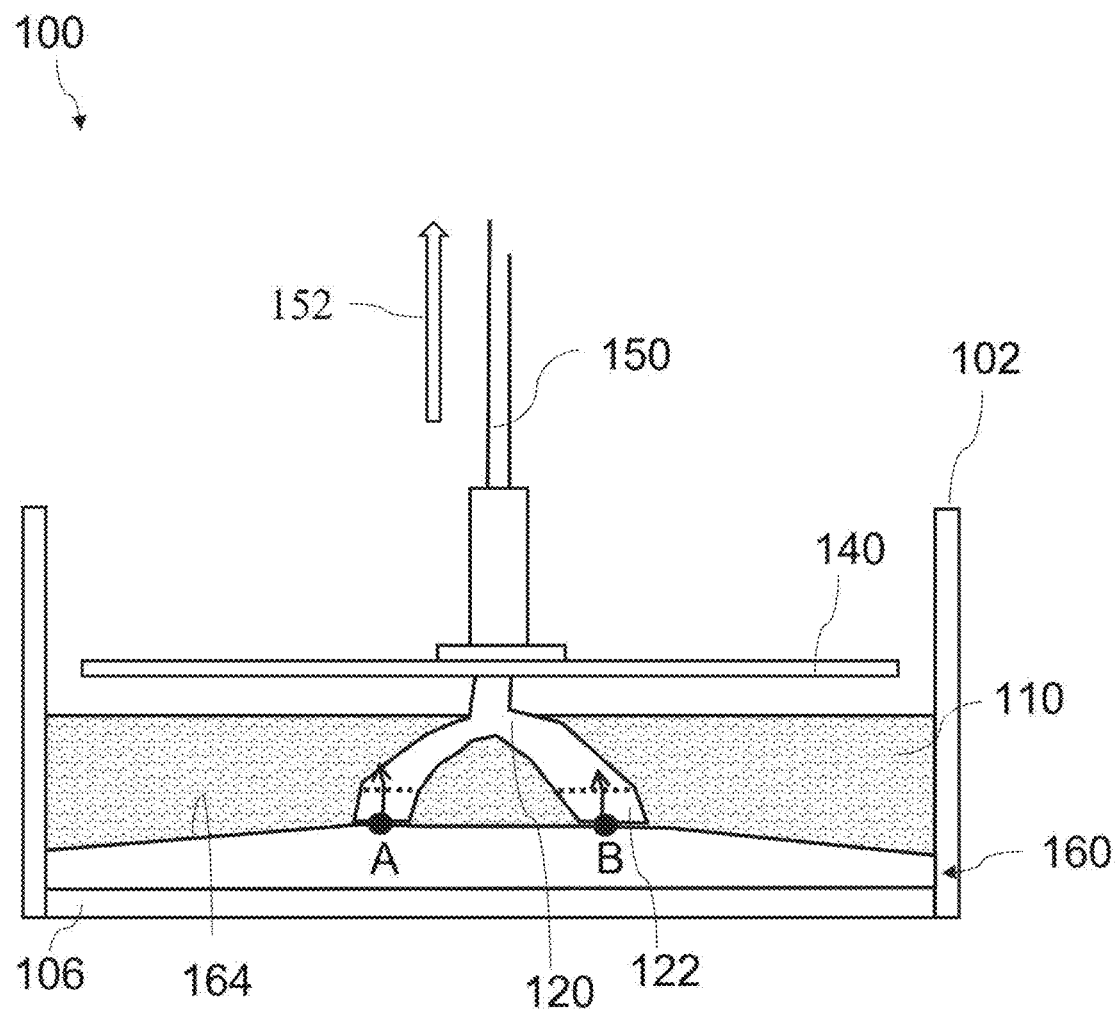
Figure 18D:
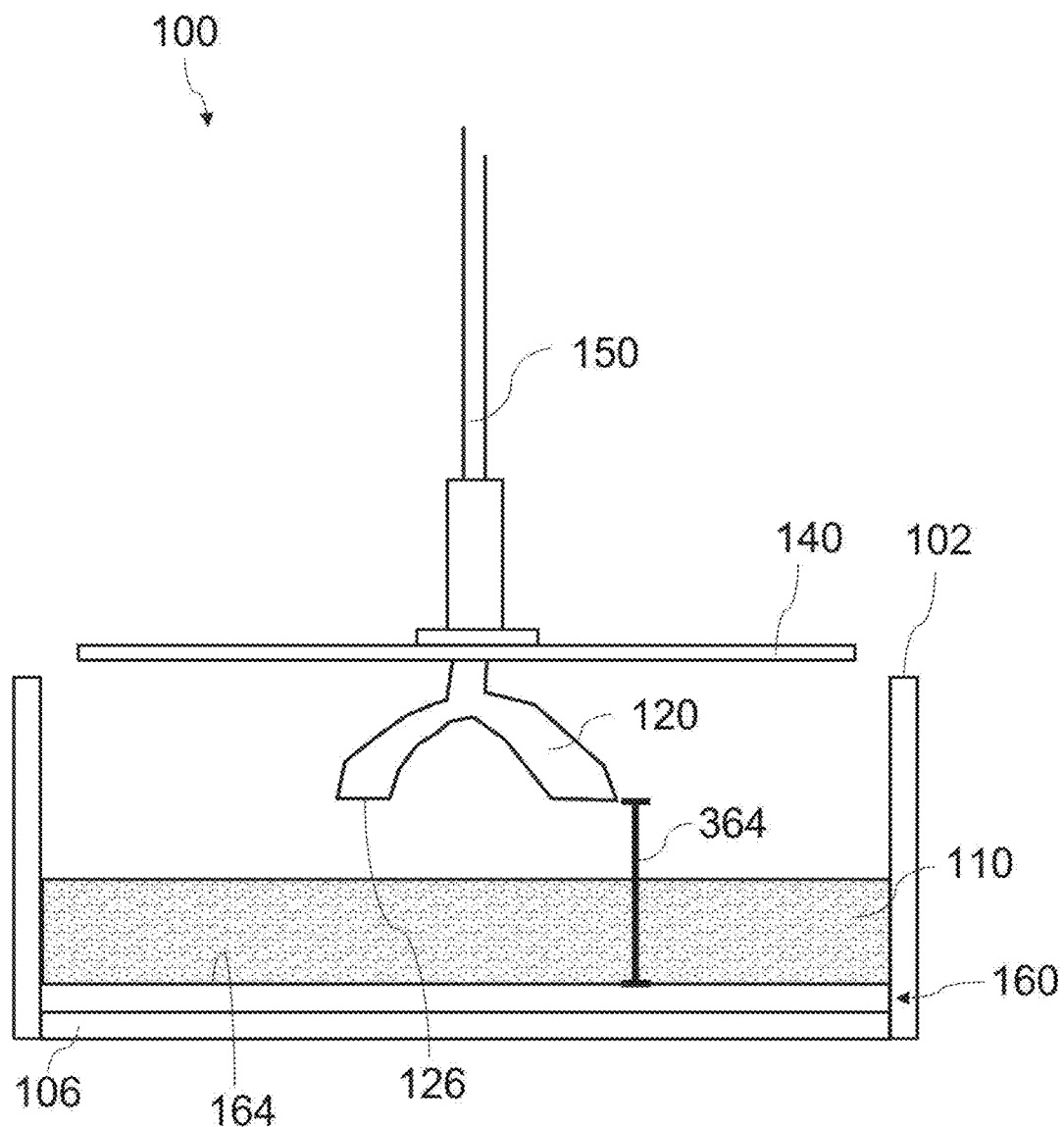

Referring now to FIGS. 17, 18C and 18D, the post-exposure stage (such as the post-exposure stages 360a and 360b) of the build cycle includes a post-exposure movement interval (such as the post-exposure movement intervals 362a and 362b). The post-exposure movement interval may begin at a post-exposure movement start time (such as the movement start times 361a and 361b) and may end at a post-exposure movement stop time (such as movement stop times 363a and 363b). During the post-exposure movement interval, the actuator 150 may be controlled (such as by the actuator signals 252 from the controller 310 shown in FIG. 1) to move the build platform 140 in the upward direction 152 away from the interface assembly 160, until the bottom layer surface 126 of the newly polymerized layer 122 is a rest distance 364 above the build surface 164. The rest distance 364 may be equal to or larger than the layer distance 144 (shown in FIG. 18A). The speed and distance that the actuator 150 moves the build platform 140 during the post-exposure movement interval may be controlled by the speed and travel distance components of the actuator signals 252. The rest distance 364 may be controlled by one or more of the travel distance and the position components of the actuator signals 252.

As seen FIG. 18C, when the actuator 150 initially moves the build platform 140 in the upward direction 152 during the post-exposure movement interval, the newly polymerized layer 122 adheres to the build surface 164 before being separated therefrom, which may exert a tension force in the upward direction 152 to deform the interface assembly 160. In the schematic view shown in FIG. 18C, the tension force is exerted at least two locations A and B on the build surface 164. In other embodiments, the tension force may be exerted on additional or fewer locations on the build surface 164 depending on the shape and configuration of the newly polymerized layer 122.

Referring back to FIG. 17, in the embodiment shown, there is a small delay between the exposure stop time (such as the exposure stop times 353a and 353b) and the post-exposure movement start time (such as the movement start times 361a and 361b), which may provide time for the sufficient polymerization of the new layer 122 before any post-exposure movement of the build platform 140. However, in other embodiments, the exposure stop time and the post-exposure movement start time may substantially coincide.

Still referring to FIG. 17, after the post-exposure stage 360a of the build cycle 322a, the build process 320 may continue again from the pre-exposure stage 340b of the subsequent build cycle 322b. However, prior to initiating the pre-exposure stage 340b, the controller 310 may use the temperature data signals 255 from the sensor 170 indicating a temperature of the feedstock 110 at the reaction interface 112 to determine whether the various components of the emission signals 251, the actuator signals 252 or the heater signals 256 (in embodiments of the device 100 including the heating source 280) need to be varied as described above for the subsequent build cycle 322b. For example, in the embodiment shown, at the pre-exposure stage 340b, the temperature data signals 255 indicate that the temperature of the feedstock 110 at the reaction interface 112 has increased when compared to the beginning of the pre-exposure stage 340a. The controller 310 may (a) adjust the duration component or the intensity component of the emission signals 251 to slightly delay the exposure interval start time 351b, increase the pre-exposure delay interval 344b, decrease the duration of the exposure interval 352b and/or decrease the intensity of the radiation emitted by the radiation source 130 emitted during the exposure interval 352b, (b) to adjust the speed component, the distance component and/or the position component of the actuator signals 252 to slightly increase the pre-exposure and post-exposure movement intervals 342b and 362b, decrease the speed of movement of the actuator 150 during the movement intervals 342b and 362b, and/or increase the rest distance 364, and (c) in embodiments including the heating source 280, slightly delay the heating interval start time 345b, decrease the duration of the heating interval 346b and/or decrease the intensity of the heat generated by the heating source 280 during the heating interval 346b.

While specific embodiments have been described and illustrated, such embodiments should be considered illustrative of the subject matter described herein and not as limiting the claims as construed in accordance with the relevant jurisprudence.

Embodiments in which an exclusive property or privilege is claimed are defined as follows:

1. An additive manufacturing device comprising:
   a container for containing feedstock, the container comprising:
     an optically transparent bottom wall;
     at least one side wall; and
     a retaining portion removably attached to the at least one side wall;
   a radiation source configured to emit radiation in an optical path incident on the bottom wall; and
   an interface assembly positioned in the optical path of the radiation above the bottom wall, the interface assembly comprising:
     a sensor configured to sense a temperature of the feedstock at a reaction interface as the radiation polymerizes at least a portion of the feedstock and constructed to meet a transparency threshold and a flexibility threshold; and
     at least one separating layer positioned above the sensor and retained by the retaining portion, wherein the at least one separating layer is configured to be replaced by detaching the retaining portion from the at least one side wall.

2. The additive manufacturing device of claim 1, wherein the transparency threshold comprises one or more of:
   a total transmission criteria comprising transmittance of at least 50% of an emissive spectrum of the radiation;
   a transmission haze criteria comprising scatter of less than 30% of the radiation at a wide-angle; and
   a transmission clarity criteria comprising scatter of less than 50% of the radiation at a narrow-angle.

3. The additive manufacturing device of claim 1, wherein the flexibility threshold comprises one or more of:
   a modulus criteria comprising a flexural modulus of less than 5 gigapascals (GPa); and
   a radius of curvature criteria comprising a radius of curvature equal to or less than 7 mm.

4. The additive manufacturing device of claim 1, wherein the sensor is a conductive film comprising a conductive material and a substrate.

5. The additive manufacturing device of claim 4, wherein the conductive material comprises a first conductive material and a second conductive material.

6. The additive manufacturing device of claim 5, wherein the first conductive material is deposited on or into a network of the second conductive material.

7. The additive manufacturing device of claim 5, wherein the first conductive material has a 1-dimensional nanostructure and the second conductive material has a 2-dimensonal nanostructure.

8. The additive manufacturing device of claim 1, wherein the sensor is a conductive hydrogel comprising conductive ions and a substrate.

9. The additive manufacturing device of claim 1, wherein the at least one separating layer comprises a least two separating layers.

10. The additive manufacturing device of claim 1, wherein the sensor comprises one of a plurality of sensors and each sensor of the plurality of sensors is associated with a region of a build area.

11. The additive manufacturing device of claim 1, wherein at least one of an intensity and a duration of the radiation emitted by the radiation source is based at least in part on the temperature of the feedstock as sensed by the sensor.

12. The additive manufacturing device of claim 1, further comprising a heating source configured to heat the feedstock, wherein at least one of an intensity and a duration of heat generated by the heating source is based at least in part on the temperature of the feedstock as sensed by the sensor.

13. The additive manufacturing device of claim 1, wherein the heating source is configured to beat the feedstock at the reaction interface as the radiation polymerizes at least a portion of the feedstock.

14. A method comprising:
   sensing a temperature of feedstock within a container of an additive manufacturing device at a reaction interface via a sensor of an interface assembly positioned above a bottom wall of the container and in the optical path of radiation emitted by a radiation source, wherein the sensor is constructed to meet a transparency threshold and a flexibility threshold; and
   replacing at least one separating layer of the interface assembly positioned above the sensor and retained by a retaining a portion removably attached to at least one side wall of the container by detaching the retaining portion from the at least one side wall.

15. The method of claim 14, wherein the transparency threshold comprises one or more of:
- a total transmission criteria comprising transmittance of at least 50% of an emissive spectrum of the radiation;
- a transmission haze criteria comprising scatter of less than 30% of the radiation at a wide-angle; and
- a transmission clarity criteria comprising scatter of less than 50% of the radiation at a narrow-angle.

16. The method of claim 14, wherein the flexibility threshold comprises one or more of:
- a modulus criteria comprising a flexural modulus of less than 5 gigapascals (GPa); and
- a radius of curvature criteria comprising a radius of curvature equal to or less than 7 mm.

17. The method of claim 14, further comprising adjusting at least one of an intensity and a duration of the radiation emitted by the radiation source based at least in part on the temperature of the feedstock as sensed by the sensor.

18. The method of claim 14, further comprising adjusting at least one of an intensity and a duration of heat generated by a heating source of the additive manufacturing device based at least in part on the temperature of the feedstock as sensed by the sensor.

19. The method of claim 14, wherein sensing the temperature of the feedstock at the reaction interface comprises sensing the temperature of the feedstock at the reaction interface as the radiation polymerizes at least a portion of the feedstock.

\* \* \* \* \*